(12) United States Patent
Lemberger et al.

(10) Patent No.: US 12,015,498 B1
(45) Date of Patent: Jun. 18, 2024

(54) ELECTRONIC DEVICE CONFIGURATION USING DUMMY DEVICES

(71) Applicant: Amazon Technologies, Inc., Seattle, WA (US)

(72) Inventors: Elliott Lemberger, Santa Monica, CA (US); John Modestine, Los Angeles, CA (US); James Sharpe, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/186,424

(22) Filed: Nov. 9, 2018

(51) Int. Cl.
  *H04L 12/28* (2006.01)
  *H04L 41/0803* (2022.01)
  *H04W 8/18* (2009.01)
  *H04W 12/00* (2021.01)
  *H04W 12/06* (2021.01)
  (Continued)

(52) U.S. Cl.
  CPC ...... *H04L 12/2809* (2013.01); *H04L 12/2803* (2013.01); *H04L 12/2807* (2013.01); *H04L 41/0803* (2013.01); *H04W 8/18* (2013.01); *H04W 12/00* (2013.01);
  (Continued)

(58) Field of Classification Search
  CPC ..... G06K 9/00771; G06K 2009/00738; G06K 9/00718; G06K 9/00711; G06K 9/00765; G06K 9/3241; G06K 9/00228; G06K 9/00744; G06K 9/00288; G06K 9/00362; G06K 9/00268; G06K 9/00342; G06K 9/00355; G06K 9/2018; G06K 9/00201; G06K 9/00979; G06K 9/2027; G06K 9/00221; G06K 9/00369; G06K 9/2081;
  (Continued)

(56) References Cited

U.S. PATENT DOCUMENTS 6,052,750 A * 4/2000 Lea ................ H04L 12/2805
  719/321
6,085,236 A * 7/2000 Lea ................ H04L 12/281
  709/230

(Continued)

FOREIGN PATENT DOCUMENTS

CN 107222373 A * 9/2017 ......... H04L 12/2807
JP 3903714 B2 * 4/2007 ......... H04L 12/2809
(Continued)

*Primary Examiner* — David N Werner
(74) *Attorney, Agent, or Firm* — Lee & Hayes, P.C.

(57) ABSTRACT

According to aspects of the present disclosure, user-defined settings may be assigned to a dummy device in response to a first request. A device identifier of a particular electronic device may later be registered with the dummy device in response to a second request. Based on receiving data indicating an installation procedure of the particular electronic device and based on the device identifier being registered with the dummy device, user-defined settings may be transmitted to cause configuration of at least some of the user-defined settings on the particular electronic device. In some cases, the data indicating an installation procedure corresponds to a beacon from the particular electronic device (e.g., a smart home device), which includes the device identifier. Further, the user-defined settings may be provided to the particular electronic device by another electronic device (e.g., another smart home device).

19 Claims, 13 Drawing Sheets

(51) Int. Cl.
*H04W 12/55* (2021.01)
*H04N 7/18* (2006.01)

(52) U.S. Cl.
CPC ......... *H04W 12/009* (2019.01); *H04W 12/06* (2013.01); *H04W 12/55* (2021.01); *H04N 7/181* (2013.01)

(58) Field of Classification Search
CPC ... H04N 7/18; H04L 41/0803; H04L 12/2807; H04L 12/2803
See application file for complete search history.

(56) References Cited

U.S. PATENT DOCUMENTS

| | | | |
|---|---|---|---|
| 7,057,769 B2 * | 6/2006 | Aoki | H04N 1/6052 358/1.9 |
| 7,193,644 B2 | 3/2007 | Carter | |
| 8,139,098 B2 | 3/2012 | Carter | |
| 8,144,183 B2 | 3/2012 | Carter | |
| 8,154,581 B2 | 4/2012 | Carter | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,652,155 B2 * | 5/2017 | Kondo | G06F 3/061 |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 9,911,318 B2 * | 3/2018 | Boettcher | C12N 15/85 |
| 10,171,476 B2 * | 1/2019 | Khan | H04L 9/3247 |
| 10,284,384 B2 * | 5/2019 | Chen | H04L 61/6068 |
| 10,841,118 B2 * | 11/2020 | Shen | H04L 12/2809 |
| 2002/0085231 A1 * | 7/2002 | Aoki | H04N 1/6052 358/2.1 |
| 2003/0191542 A1 * | 10/2003 | Iwamoto | G05B 19/4185 700/2 |
| 2004/0068756 A1 * | 4/2004 | Chiu | H04N 21/44231 725/135 |
| 2004/0098515 A1 * | 5/2004 | Rezvani | G06F 3/04842 713/375 |
| 2005/0102408 A1 * | 5/2005 | Nakamura | H04L 12/2856 709/228 |
| 2009/0271002 A1 * | 10/2009 | Asofsky | G05B 15/02 700/3 |
| 2010/0103947 A1 * | 4/2010 | Anschutz | H04L 12/2892 370/420 |
| 2010/0180019 A1 * | 7/2010 | Elston, III | H04W 12/12 709/222 |
| 2010/0281161 A1 * | 11/2010 | Cohn | G08B 13/00 709/224 |
| 2011/0258226 A1 * | 10/2011 | Schatzmayr | H04L 29/12122 707/769 |
| 2012/0287034 A1 * | 11/2012 | Park | H04L 12/2809 709/204 |
| 2013/0086232 A1 * | 4/2013 | Hwang | H04W 4/00 709/221 |
| 2013/0322354 A1 * | 12/2013 | Wang | H04L 12/2832 370/329 |
| 2014/0250183 A1 * | 9/2014 | Unagami | H04M 3/5166 709/204 |
| 2015/0097689 A1 * | 4/2015 | Logue | H04W 4/70 340/632 |
| 2015/0160935 A1 * | 6/2015 | Nye | H04L 67/34 717/178 |
| 2015/0242381 A1 * | 8/2015 | Oh | H04L 51/066 715/204 |
| 2015/0268858 A1 * | 9/2015 | Kondo | G06F 3/061 710/4 |
| 2015/0310201 A1 * | 10/2015 | Sugiyama | H04W 12/12 726/7 |
| 2016/0154390 A1 * | 6/2016 | Zhang | G05B 15/02 700/275 |
| 2016/0284206 A1 * | 9/2016 | Boettcher | G08B 13/00 |
| 2016/0337190 A1 * | 11/2016 | Wachter | H04W 76/10 |
| 2016/0381536 A1 * | 12/2016 | Li | H04L 67/18 455/41.1 |
| 2017/0012795 A1 * | 1/2017 | Chen | H04L 61/6068 |
| 2017/0243204 A1 * | 8/2017 | Murphy | G06Q 20/3829 |
| 2017/0272269 A1 * | 9/2017 | Siminoff | H04M 11/025 |
| 2017/0280112 A1 * | 9/2017 | Siminoff | H04N 5/91 |
| 2017/0295058 A1 * | 10/2017 | Gottschalk | H04L 41/0803 |
| 2018/0132290 A1 * | 5/2018 | Shen | H04L 12/2809 |
| 2018/0197633 A1 * | 7/2018 | Mehta | G16H 40/20 |
| 2019/0121999 A1 * | 4/2019 | Sinha | G06F 21/6245 |
| 2019/0312746 A1 * | 10/2019 | Myers, III | H04L 12/2807 |
| 2019/0335324 A1 | 10/2019 | Ringland | |

FOREIGN PATENT DOCUMENTS

| | | | | |
|---|---|---|---|---|
| JP | 5646018 B1 * | 12/2014 | ......... | G06F 3/04817 |
| WO | WO-0028436 A1 * | 5/2000 | ......... | H04L 12/2814 |
| WO | WO-0043900 A1 * | 7/2000 | ......... | H04L 12/2803 |

* cited by examiner

ELECTRONIC DEVICE CONFIGURATION USING DUMMY DEVICES

TECHNICAL FIELD

Some of the present embodiments relate to systems that include electronic devices, such as smart home devices, automation devices, and/or audio/video (A/V) recording and communication devices. In particular, the present embodiments relate to improvements to configuring the electronic devices to operate within the systems.

BACKGROUND

Home safety is a concern for many homeowners and renters. Those seeking to protect or monitor their homes often wish to be informed of breaches to the security of their homes and also have video and audio communications with visitors/trespassers, for example, those visiting/trespassing near an external door or entryway. Security systems that include sensors, automation devices, and/or A/V recording and communication devices, such as doorbells, provide this functionality, and may also aid in crime detection and prevention. For example, sensor information, audio, and/or video captured by a security system, such as by an A/V recording and communication doorbell of a security system, may be uploaded to the cloud and recorded on a remote server. Subsequent review of the sensor information and/or the A/V footage may aid law enforcement in capturing perpetrators of home burglaries and other crimes. Further, the presence of a security system including one or more an A/V recording and communication devices on the exterior of a home, such as a doorbell unit at the entrance of a home, acts as a powerful deterrent against would-be burglars.

BRIEF DESCRIPTION OF THE DRAWINGS

The various embodiments of the present electronic device configuration using dummy devices now will be discussed in detail with an emphasis on highlighting the advantageous features. These embodiments depict the novel and non-obvious electronic device configuration using dummy devices shown in the accompanying drawings, which are for illustrative purposes only. These drawings include the following figures, in which like numerals indicate like parts.

DETAILED DESCRIPTION

Figure 1A:
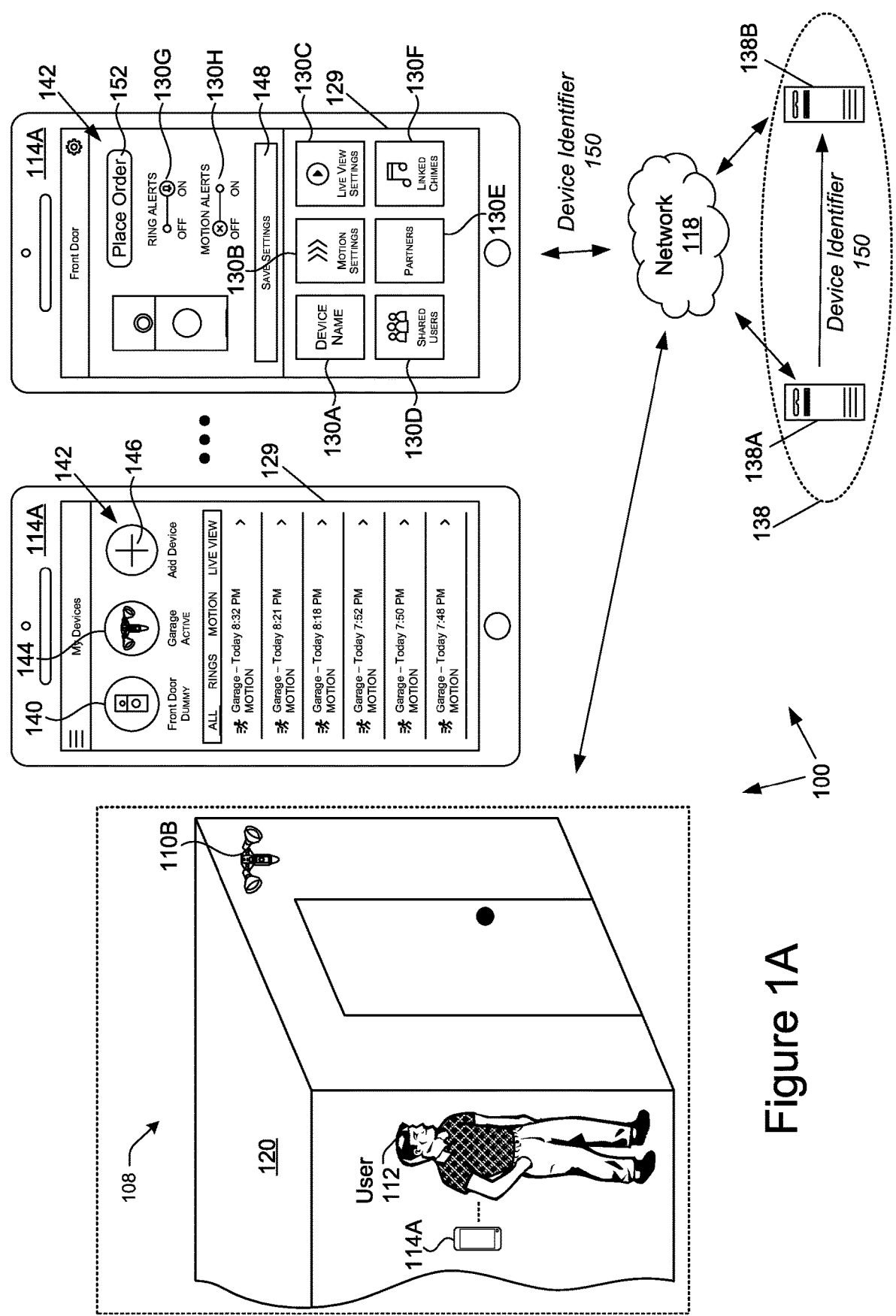
FIGS. 1A and 1B are schematic diagrams illustrating examples of electronic device configuration, according to various aspects of the present disclosure.

The techniques discussed herein provide electronic device configuration, such as A/V device configuration, using dummy devices, which may improve the safety of a user's property, the occupants of the property, and/or the surrounding area. In particular, aspects of the present disclosure include the realization that when a user receives a purchased electronic device, such as an A/V recording and communication device (alternatively referred to herein as an "A/V device")," the electronic device must often be configured prior to being used. Configuring an electronic device that has factory settings may require the user to participate in a potentially lengthy and complex installation procedure. Some users may be unable to complete the installation procedure due to its complexity, and others may improperly configure the electronic device. Where the electronic device is a security device, such as an A/V recording and communication device, improper configuration may decrease the effectiveness of the electronic device. For example, the installation procedure may involve the user providing network credentials to an A/V recording and communication device, and without the network credentials, the A/V recording and communication device may not be usable to notify the user of security events at his or her property. As another example, the installation procedure may involve the user providing various settings used to detect the security events, and improper settings may result in erroneous notifications of security events and/or an absence of at least some desirable notifications of security events.

Aspects of the present disclosure further include the realization that when a user orders an electronic device, the electronic device may be received and/or configured by an unauthorized party. For example, the electronic device may be delivered to the wrong address, or a parcel containing the recently delivered device may be stolen from the user by a parcel thief, and an unauthorized party may then configure and use the electronic device. As a further example, where an installation procedure of an electronic device allows for wireless configuration, an unauthorized party may provide problematic settings to the electronic device. For example, the unauthorized party may be able to provide network credentials for a network accessible to the unauthorized party, such that the unauthorized party may interact with an A/V device on the user's property from a remote location.

Various embodiments of the present disclosure provide solutions to these problems by, for example, allowing a user to define at least some settings of an electronic device, such as a smart home device (e.g., an A/V device), prior to receiving a particular device and/or before the identity of the particular device is known to the user and/or a computing system (e.g., prior to an installation procedure). In some embodiments, a user may provide user input to a client device, such as via a graphical user interface (GUI), to assign user-defined settings to a dummy device. The dummy device is not associated with any particular electronic device, but may represent a class of electronic devices, such as a specific type or model of electronic device, of which many may be available for different dummy devices. Once a device identifier of a particular electronic device to be configured is known, the system may register the particular electronic device as the dummy device using the device identifier. For example, the device identifier may be received from the particular electronic device (e.g., based on a purchase made by the user) or a scan of the particular electronic device and/or a code associated with the particular electronic device (e.g., a code on packaging of the particular electronic device, or an RFID tag on the packaging of the particular electronic device or on the device itself). This process may occur, as examples, at a shipping facility that ships the particular electronic device, or at the user's property upon receipt of the particular electronic device. The device identifier may be used to identify the particular electronic device in association with an installation procedure, such as to configure the particular electronic device with the user-defined settings. Using this approach, the installation and/or configuration procedure may be simplified as at least some user-defined settings may be defined in advance.

In various embodiments, data indicating an installation procedure of the particular electronic device may be received and used to apply the appropriate user-defined settings to configure the electronic device. For example, the installation procedure may include the particular electronic device transmitting the data (e.g., in a beacon signal, which may make the device discoverable via Bluetooth or another wireless technology described herein, such as a low power wide-area network (LPWAN) and/or an Ultra Narrow Band modulation technology network such as RingNet) or a user scanning the particular electronic device and/or a code associated with the particular electronic device (e.g., scanning packaging of the particular electronic device or the device itself using a smartphone camera, or receiving a radiofrequency transmission from a tag, such as an RFID tag, on the packaging of the particular electronic device or on the device itself). The data is used to determine and/or infer the installation procedure corresponds to the particular electronic device. For example, the data may be representative of the device identifier and matched to data registering the electronic device as the dummy device (e.g., on a client device, a network device, and/or a smart home device) in order to identify the electronic device. Additionally, or alternatively, the data in combination with user account data may be used to infer the identity. The user account data may include purchase or order data representative of any combination of a purchase or ordering of the electronic device, a class of electronic devices purchased or ordered, and a date of purchase or order of the electronic device. As another example, the user account data may include shipping data representative of any combination of shipment and/or delivery of the electronic device, such as a shipping address of the electronic device, a shipping confirmation, and a delivery confirmation. Using this approach, the electronic device may receive the appropriate user-defined settings, and unauthorized parties may be prevented from configuring and using the electronic device.

In various embodiments, a user may assign user-defined settings to a dummy device that is not associated with any particular electronic device, but may represent a class of electronic devices, such as a specific type or model of electronic device. For example, using a GUI, the user may add any number of dummy devices of various classes to a user account and define settings for those devices. This process may be done, for example, to plan out and set up the user's security system and/or smart home system. Later, the user may purchase or order one or more electronic devices that correspond to one or more of the dummy devices. For example, the GUI may enable the user to purchase and/or order each dummy device. A device identifier of a particular electronic device may be used to register the particular electronic device as the dummy device. This process may designate the user-defined settings as belonging to the particular electronic device.

The particular electronic device may be registered at one or more of a backend server, another A/V device, a client device, and a hub device to facilitate a determination of which user-defined settings to provide to the particular electronic device during an installation procedure of the particular electronic device (e.g., based on the user purchasing the electronic device). The user-defined settings may be provided (e.g., transmitted) to the particular electronic device by any combination of the other devices. In various embodiments, data indicating the installation procedure is received and used to determine whether to provide user-defined settings to the particular electronic device and/or which user-defined settings to provide to the particular electronic device. In some embodiments, the data represents the device identifier of the particular electronic device, and the user-defined settings may be provided to the particular electronic device based on the data matching the data registering the particular electronic device as the dummy device.

At least some of the data indicating the installation procedure of a particular electronic device may be generated from scanning a code, such as a Quick Response (QR) code or a barcode associated with the particular electronic device (e.g., on the device itself and/or packaging thereof). The code may represent the device identifier of the particular electronic device. Additionally, or alternatively, at least some of the data indicating the installation procedure of the particular electronic device may be generated from data provided from the particular electronic device, such as in a beacon (which may make the device discoverable via Bluetooth or another wireless technology described herein) transmitted by the particular electronic device during the installation procedure. The data may be representative of the device identifier and/or an API call or other identifier of the installation procedure.

In some embodiments, the user-defined settings may be provided to the particular electronic device based on user account data, such as shipping data representative of any combination of shipment and/or delivery of the electronic device, such as a shipping address of the electronic device, a shipping confirmation, and a delivery confirmation. For example, the system may determine and/or infer the installation procedure corresponds to the electronic device and/or the installation procedure is authorized based on the user account data.

The remaining detailed description describes the present embodiments with reference to the drawings. In the drawings, reference numbers label elements of the present embodiments. These reference numbers are reproduced below in connection with the discussion of the corresponding drawing features.

Figure 1B:
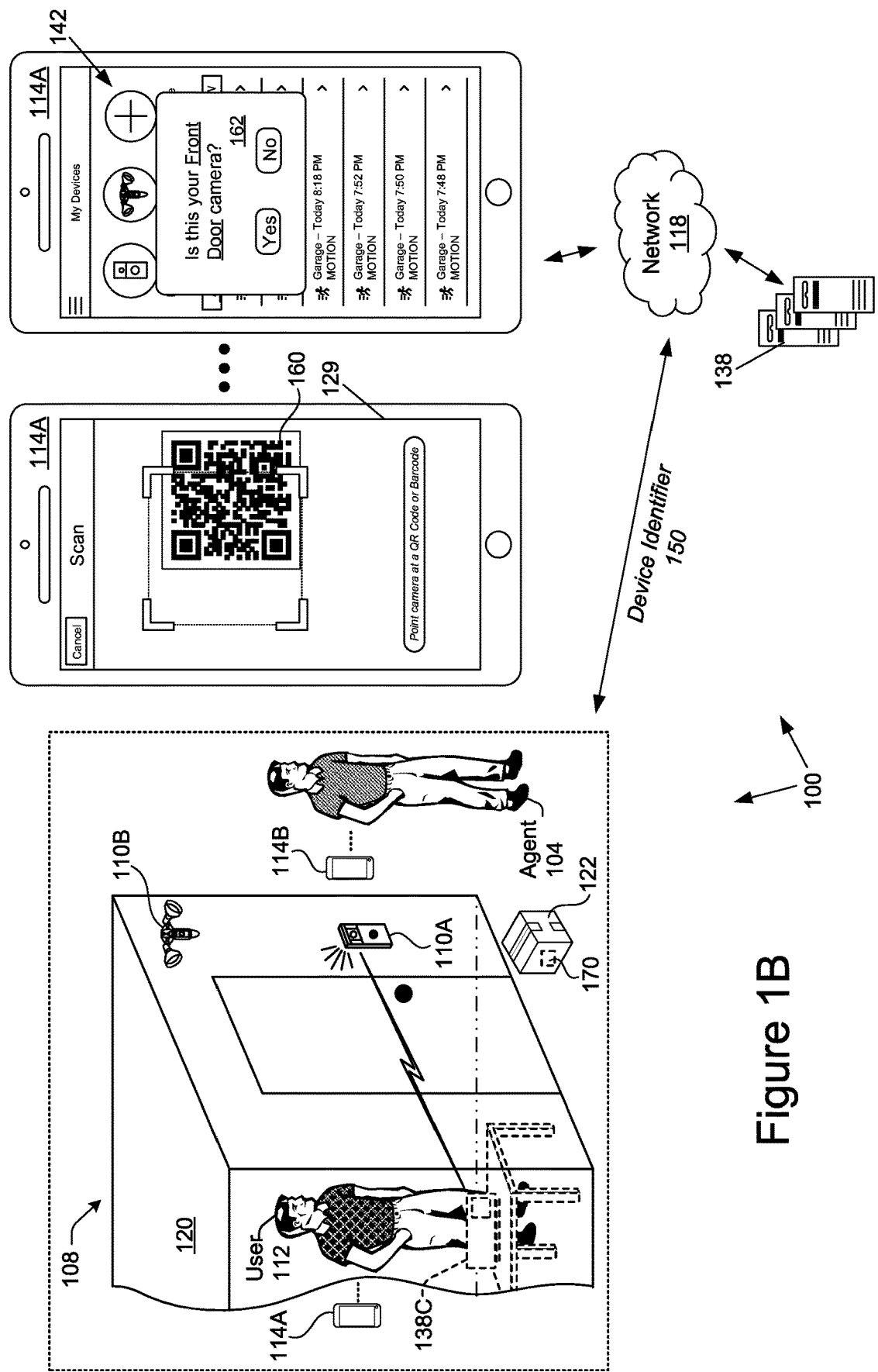

FIGS. 1A and 1B are schematic diagrams illustrating examples of electronic device configuration, according to various aspects of the present disclosure. FIGS. 1A and 1B show a first client device 114A, a second client device 114B, one or more network device(s) 138 (also referred to as "the network device 138"), a first A/V device 110A, and a second A/V device 110B, which may communicate over one or more network(s) 118.

FIGS. 1A and 1B also show an environment 108, such as a user's property, an outdoor environment, an indoor environment, etc. In the example shown, the environment 108 includes a building 120, such as a house or an office, which may be associated with a user 112 of the first client device 114A (e.g., the user may live in or work at the building 120). The environment 108 further includes the first A/V device 110A, the second A/V device 110B, the first client device 114A (and the second client device 114B in FIG. 1B), and may further include at least one of the network devices 138. The network device(s) 138 may include one or more of any combination of a smart-home hub device, a hub of a security/alarm system, a virtual assistant (VA) device, a backend server, and a backend API. Network devices 138A, 138B, and 138C are shown as examples of the network devices 138. The network device(s) 138C shown in FIG. 1B in the environment 108 may include, for example, a smart-home hub device, a hub of a security/alarm system, a virtual assistant (VA) device, and/or another device, as described herein. In embodiments where the network device 138 includes a backend server, the backend server may typically be located remote from the environment 108. Further, embodiments that employ at least one backend server or API for the network device 138 may or may not include a smart-home hub device or a VA device as a network device(s) 138. As examples, description of the network device 138 for FIGS. 1A and 1B may pertain to just a backend server(s), just a backend API(s), just a smart-home hub device(s), just a hub of a security/alarm system, just a VA device(s) and/or any combination thereof.

A computing system 100 may include one or more of the first client device 114A, the second client device 114B, the network device(s) 138, the first A/V device 110A, and the second A/V device 110B for facilitating electronic device configuration. For example, the computing system 100 may be used to configure the first A/V device 110A and/or the second A/V device 110B in accordance with one or more user-defined settings, such as settings 130 of the first A/V device 110A, which include, by way of example, settings 130A, 130B, 130C, 130D, 130E, and 130F. The settings 130 may include one or more key-value pairs or may otherwise be structured to represent particular settings and corresponding values thereof. By way of example, the settings 130 are indicated in FIG. 1A using corresponding interface elements of a GUI 142 on a display 129, which the user 112 may interact with via user input to set and/or modify a corresponding set of settings. However, in various embodiments, a user may define settings using any suitable approach, which may or may not include a GUI.

The system 100 allows the user 112 to define at least some of the settings 130 of the first A/V device 110A prior to receiving the first A/V device 110A and/or before the identity of the first A/V device 110A is known to the user 112 and/or the system 100 (e.g., prior to an installation procedure). In some embodiments, the user 112 may provide user input to the first client device 114A, such as via the GUI 142, to assign the settings 130 to a dummy device 140, generally represented visually in FIG. 1A in the GUI 142.

The dummy device 140 is not associated with any particular electronic device, but may represent a class of electronic devices, such as a specific type or model of electronic device, of which many may be available for different dummy devices. A class of electronic devices may include, for example, one or more electronic devices that share a common set of settings. Examples of classes of electronic devices include, for example, a security camera, a light camera (e.g., a floodlight camera, a spotlight camera, etc.), a video doorbell (e.g., a wall-powered and/or a battery-powered video doorbell). In some cases, a class of electronic devices may refer to a particular model of electronic device.

As one example, the user 112 may selectively add the dummy device 140 to a set of devices associated with a user account of the user 112. The set of devices may include one or more particular and/or dummy devices, such as a particular device 144 corresponding to the second A/V device 110B. In FIG. 1A, the user may provide user input to an interface element 146 to add a new dummy device. For example, a user selection of the interface element 146 may present the user with selectable options to add a new dummy device or a particular device. There are many variations to adding a new dummy device, and the illustrated interface element 146 is merely one example. The user may further use the GUI 142 to define various ones of the settings 130 for the dummy device 140, and may save the settings 130 (or any changes or updates thereto) to the dummy device 140.

Once the device identifier 150 of the first A/V device 110A to be configured is known, the system 100 may register the first A/V device 110A as the dummy device 140 using the device identifier 150. This process may occur in various ways, some of which may be illustrated using FIGS. 1A and 1B. In some embodiments, this process occurs based at least in part on the user 112 making a purchase, or order, corresponding to the dummy device 140. For example, the user 112 may place the order using an interface element 152. For example, based on placement of an order, the system 100 may select, assign, and/or determine the device identifier 150 for the dummy device 140. In some embodiments, registering the first A/V device 110A as the dummy device 140 may include the network device 138A transmitting data representative of the device identifier 150 to another network device, such as the network device(s) 138B and/or 138C. For example, the network device 138A may be an order processing and/or recording server or device that selects, assigns, and/or determines the device identifier 150 and provides the device identifier 150 to another device used for an installation procedure of electronic devices, such as a configuration server or device.

Additionally, or alternatively, the network device 138A may be a shipping server or device that selects, assigns, and/or determines the device identifier 150 in association with shipment of the first A/V device 110A (e.g., to a property associated with the user 112). For example, the network device 138A may be at a shipping facility that ships the package 122, shown in FIG. 1B, to the user 112. For example, at the shipping facility, a device, such as a client device, may be used to scan a code 160 to generate data representative of the device identifier 150. The code 160 may include a visual representation of the device identifier 150, such as a QR code (shown in FIG. 1B), or a barcode. The scanned data may be assigned to the dummy device 140 to register the first A/V device 110A as the dummy device 140. The code 160 may be on or placed on or in the package 122 (e.g., at the shipping facility), such as a shipping package and/or a product package, or may be on or placed on the first A/V device 110A. Additionally, or alternatively, the device identifier 150 may be stored electronically in the first A/V device 110A and/or on a tag (e.g., radio-frequency identification (RFID) tag) that may be located on the first A/V device 110A and/or the package 122.

In some embodiments, the network device 138A may select, assign, and/or determine the device identifier 150 in association with registering the first A/V device 110A, and based on the selection, assignment, and/or determination, electronically store the device identifier 150 on the first A/V device 110A, in an associated tag, and/or on the first A/V device 110A and/or the package 122 such that it may be extracted in association with an installation procedure of the first A/V device 110A, described further below.

The disclosure herein related to a shipping facility may similarly apply to a retail environment. For example, any of the forgoing (e.g., scanning) could be performed by and/or associated with a point of sale device at a retail store or elsewhere. As an example, the first A/V device 110A could be registered to the dummy device 140A based at least in part on a purchase of the first A/V device 110A using a point of sale device. Further, the network devices 138A and 138B need not be part of the same system, and could be parts of separate systems maintained and/or owned by different entities (e.g., legal entities).

Additionally, or alternatively, the user 112 and/or a delivery agent 104 of the package 122 may perform the scan used to register the first A/V device 110A. For example, the user 112 may purchase the first A/V device 110A at a retail store and scan the package 122 and/or the first A/V device 110A using the first client device 114A, or the first client device 114A may receive the device identifier 150 wirelessly as mentioned above. As a further example, the delivery agent 104 could perform similar steps using the second client device 114B in association with delivery of the package 122.

In addition to or instead of receiving the device identifier 150, in some embodiments, the first A/V device 110A and/or a battery powered device 170 may receive one or more settings (e.g., a configuration file), such as any combination of the user-defined settings described herein. The battery powered device 170 may be shipped and/or delivered with the package 122 and can refer to the first A/V device 110A and/or a separate device on or in the package 122. For example, based on the purchase and/or order of the first A/V device 110A, the system 100 may store one or more settings on the first A/V device 110A and/or a battery powered device 170. In some embodiments, this process occurs based at least in part on the user 112 making a purchase, or order, corresponding to the dummy device 140. For example, the user 112 may place the order using the interface element 152. For example, based on placement of an order, the system 100 may select, assign, and/or determine the one or more settings to store on the first A/V device 110A and/or a battery powered device 170. In some embodiments, registering the first A/V device 110A as the dummy device 140 may include the network device 138A transmitting data representative of the one or more settings to another network device, such as the network device(s) 138B and/or 138C. For example, the network device 138A may be an order processing and/or recording server or device that selects, assigns, and/or determines the one or more settings and provides the one or more settings to another device used to store the one or more settings on the first A/V device 110A and/or a battery powered device 170.

Additionally, or alternatively, the network device 138A may be a shipping server, such as the shipping server described above that selects, assigns, and/or determines the one or more settings in association with shipment of the first A/V device 110A (e.g., to a property associated with the user 112). For example, at the shipping facility, a device, such as a client device, may be used to electronically store in the first A/V device 110A and/or the battery powered device 170 the one or more settings.

The disclosure related to the shipping facility may similarly apply to a retail environment. For example, any of the forgoing (e.g., storing) could be performed by and/or associated with a point of sale device at a retail store or elsewhere. As an example, the first A/V device 110A and/or the battery powered device 170 could receive the one or more settings based at least in part on a purchase of the first A/V device 110A using a point of sale device. Further, the network devices 138A and 138B need not be part of the same system, and could be parts of separate systems maintained and/or owned by different entities (e.g., legal entities). As a further example, the delivery agent 104 could perform similar steps using the second client device 114B in association with delivery of the package 122.

In embodiments where the device identifier 150 is provided, it may be used to identify the first A/V device 110A in association with an installation procedure, such as to configure the first A/V device 110A with at least some of the settings 130. For example, as shown in FIG. 1B, the delivery agent 104 may deliver the package 122 to a property. The user 112 (e.g., the same or a different user from the user that ordered the device) may then initiate the installation procedure of the first A/V device 110A.

The installation procedure may be initiated in various ways and/or involve various steps. In some embodiments, this process includes powering on the first A/V device 110A. Additionally, or alternatively, this process may include the user 112 providing user input to one or more buttons on the first A/V device 110A, such as a setup button. As a further example, the installation procedure may include the user 112 providing user input to the first client device 114A, such as to the GUI 142. For example, the user may provide user input to the interface element 146 to trigger the installation procedure of the first A/V device 110A.

In various embodiments, data indicating the installation procedure of the first A/V device 110A may be received and used to apply the appropriate settings 130 to configure the first A/V device 110A. For example, the installation procedure may include the first A/V device 110A transmitting the data (e.g., in a beacon signal, which may make the device discoverable via Bluetooth or another low power wireless technology described herein) or the user 112 scanning the first A/V device 110A and/or the code 160 associated with the first A/V device 110A (e.g., scanning the package 122 of the first A/V device 110A or the first A/V device 110A itself using a camera of the first client device 114A).

The data indicating the installation procedure may be used by the system 100 to determine and/or infer the installation procedure corresponds to the first A/V device 110A and/or the installation procedure is authorized (e.g., the correct user is installing the device). This determination may occur on any combination of the first client device 114A, any of the network devices 138A, or another smart home device, such the second A/V device 110B, which is already configured and installed. Any data used for the determination may be received by that device from another of the devices. The data may be representative of the device identifier 150 and matched to the data registering the first A/V device 110A as the dummy device 140 in order to identify the first A/V device 110A (e.g., the device identifier from the received data is the same as the device identifier used to register the first A/V device 110A). As indicated above, this process may occur on a client device, a network device, and/or a smart home device. For example, the network device 138A or the network device 138B could provide the device identifier 150 to the first client device 114A, the network device 138C, and/or the second A/V device 110B, any of which may determine and/or infer the installation procedure corresponds to the first A/V device 110A and/or the installation procedure is authorized using the data.

Additionally, or alternatively, the data indicating the installation procedure may be used in combination with user account data by the system 100 to determine and/or infer the installation procedure corresponds to the first A/V device 110A and/or the installation procedure is authorized. The user account data may include purchase or order data representative of any combination of a purchase or ordering of the electronic device, a class of electronic device purchased or ordered, and a date of purchase or order of the electronic device. This data may have been generated, for example, based on the user input to the GUI 142, or another GUI or input interface, by the user 112 or another authorized user. For example, purchase data may be based on user input to at least the interface element 152, and the class may be selected by user input when adding the dummy device 140, such as using the interface element 146.

Additionally, or alternatively, the user account data may include shipping data representative of any combination of shipment and/or delivery of the first A/V device 110A, such as a shipping address of the first A/V device 110A, a shipping confirmation, and a delivery confirmation. The shipping data may, for example, be generated in association with the shipping facility mentioned above. In some embodiments, the system 100 determines the installation procedure corresponds to the first A/V device 110A based on comparing the shipping address to location data from (e.g., generated by and/or received from) the first client device 114A, the network device 138C, the first A/V device 110A, the second A/V device 110B, and/or another device associated with the property corresponding to the shipping address. The location data may refer to one or more geographic locations and/or location information that identifies a location of the first A/V device 110A. Examples include GNSS (global navigation satellite system) data, such as GPS (global positioning system) data, an IP address of a local network, such as a cellular or Wi-Fi network, and the like. In some cases, the system 100 may determine and/or infer the installation procedure corresponds to the first A/V device 110A and/or the installation procedure is authorized based on determining a proximity of a location extracted from the location data to the shipping address.

Additionally, or alternatively, a shipping confirmation associated with the first A/V device 110A (e.g., generated by a device at a shipping facility) may be used by the system 100 to determine and/or infer the installation procedure corresponds to the first A/V device 110A and/or the installation procedure is authorized. For example, the system 100 may compare a time corresponding to the shipping confirmation to a time corresponding to the installation procedure to determine and/or infer the installation procedure corresponds to the first A/V device 110A (e.g., by comparing corresponding timestamps) and/or the installation procedure is authorized. Additionally, or alternatively, the system 100 may determine and/or infer the installation procedure corresponds to the first A/V device 110A and/or the installation procedure is authorized based on identifying the shipping confirmation regardless of such as comparison.

Additionally, or alternatively, a delivery confirmation associated with the first A/V device 110A (e.g., generated by a device at a shipping facility) may be used by the system 100 to determine and/or infer the installation procedure corresponds to the first A/V device 110A and/or the installation procedure is authorized. For example, the system 100 may compare a time corresponding to the delivery confirmation to a time corresponding to the installation procedure to determine and/or infer the installation procedure corresponds to the first A/V device 110A (e.g., by comparing corresponding timestamps) and/or the installation procedure is authorized. Additionally, or alternatively, the system 100 may determine and/or infer the installation procedure corresponds to the first A/V device 110A and/or the installation procedure is authorized based on identifying the delivery confirmation regardless of such a comparison. In some embodiments, the delivery confirmation may be generated, at least in part, by the second client device 114B. For example, the delivery agent 104 may deliver the package 122 and use the second client device 114B to generate the delivery confirmation.

Based at least in part on the receiving of the data indicating the installation procedure of the first A/V device 110A (e.g., based on having determined the settings 130 are for the first A/V device 110A), the system 100 may transmit data representative of at least a portion of the settings 130. This transmitting may cause configuration of at least some of the settings 130 on the first A/V device 110A. For example, the first client device 114A, the network device(s) 138, and/or the second A/V device 110B could transmit at least some of the settings 130 to the first A/V device 110A. This process may result in the dummy device 140 being replaced with a particular device representing the first A/V device 110A in the GUI 142, similar to the particular device 144 corresponding to the second A/V device 110B in FIG. 1A.

Prior to causing configuration of at least some of the settings 130 on the first A/V device 110A, the system 100 may cause presentation of at least one prompt for a confirmation of one or more of the settings 130. For example, FIG. 1B shows a prompt 162 presented on a display 129 of the first client device 114A. The prompt 162 allows a confirmation or denial of one or more of the settings 130 via respective interface elements, as shown. It is contemplated that the prompt 162 need not be on the display 129 and could take other forms, such as a verbal prompt where the user may verbally confirm or deny the settings 130. In the example shown, the prompt 162 includes a device label, or device name 130A (e.g., Front Door) setting for the first A/V device 110A, to provide information to assist the user 112 in confirming or denying the settings 130. A setting, such as the device label, used to confirm the settings 130 for the first A/V device 110A may not necessarily be transmitted to the first A/V device 110A. For example, one or more different settings may be transmitted to configure the first A/V device 110A. Further, another example of a setting that may be presented includes a network name (e.g., SSID (service set identifier)) for a network corresponding to network settings 130E included in the settings 130. In some embodiments, the network settings 130E further include credentials for the network.

In embodiments that include a prompt, the system 100 may transmit the data representative of at least a portion of the settings 130 based on user input that provides the confirmation. Where the user input provides the denial, the data may not be transmitted in response to the denial. Further, the user may change one or more of the settings 130 as desired for the first A/V device 110A, may select a different dummy device to configure with the settings 130, may be directed to initiate an installation procedure for a different device, and/or may be directed to scan a code of the different device as part of the installation procedure.

The first A/V device 110A may be configured using any combination of the settings 130. In some embodiments, this process includes network credentials for the first A/V device 110A to use, such as credentials for a local area network, which may be a Wi-Fi network, for example. In some embodiments, the first A/V device 110A receives the data comprising the network credentials and automatically connects to the corresponding network using the credentials. Further, the first A/V device 110A may automatically connect to another device, such as any combination of the network device(s) 138 as part of the installation procedure. For example, one or more additional settings (e.g., the settings 130 and/or one or more different settings) for the first A/V device 110A may be received by the first A/V device 110A over the network (e.g., a firmware update, a system software patch, etc.). In some embodiments, the data used to configure the first A/V device 110A may include a server address(es) of the network device(s) 138 and/or a port number(s) to be used by the first A/V device 110A to communicate with the network device(s) 138.

Other examples of the settings 130 that may be provided to the first A/V device 110A or otherwise may be used to configure the first A/V device 110A (e.g., on the first client device 114A and/or the network device 138) include motion settings 130B. Motion settings 130B may include motion zone settings. Motion zone settings may allow the user 112 to define a specific area the first A/V device 110A will monitor for movement while ignoring any movement outside that area. In some embodiments, a user may draw one or more motion zones on the display 129 of the first client device 114A or otherwise provide settings for a motion zone. Another example includes motion scheduling settings allowing the user 112 to schedule brief interruptions in coverage to avoid receiving alerts triggered by a regular occurrence. A further example includes motion sensitivity for motion detection, such as using a slider to adjust what detected activity will cause the first A/V device 110A to trigger motion events.

Further examples of the settings 130 include live view settings 130C. At least some of the live view settings 130 may define how often the first A/V device 110A checks in with a live view using a camera of the first A/V device 110A (e.g., for motion detection). Another setting may be used to selectively enable or disable the live view for the first A/V device 110A and/or for a remote live view on demand that may be viewed on the first client device 114A. Other examples of the settings 130 include linked signaling devices 130F. Where the A/V device 130F is a video doorbell, this process may be used to select a signaling device for the doorbell. Shared user settings 130D may allow the user 112 to specify one or more other users (e.g., user accounts) to share control of the first A/V device 110A with those users. This process may enable the other users to complete the installation procedure, change the settings 130, and/or view images represented by image data captured using the first A/V device 110A. Other examples of the settings 130 allow the user 112 to enable or disable alerts corresponding to the first A/V device 110A and/or motion alerts 130H corresponding to motion events detected by the first A/V device 110A. These are just some of the examples of the settings 130 and it is contemplated that more or fewer settings could be employed.

As mentioned above, the battery powered device 170 may be shipped and/or delivered with the package 122 and can refer to the first A/V device 110A and/or a separate device on or in the package 122. In some embodiments, the battery powered device 170 is configured to connect to, pair to, and/or detect a wireless network while the package 122 remains unopened. The wireless network could be any of the various networks described herein, such as a Wi-Fi network (e.g., the user's network 218), an X10 network, a 6LoWPAN, a BLE network, a ZigBee network, a Z-Wave network, and/or an LPWAN. This process may occur, for example, while the battery powered device 170 is proximate to the building 120 and/or based on delivery of the package 122. As an example, the delivery agent 104 may use the second client device 114B in association with delivery of the package 122 to transmit data to the battery powered device 170 that causes the battery powered device 170 to search for the wireless network. As another example, the delivery agent 104 could press a button on the package 122 or otherwise activate the battery powered device 170 and/or the connection, pairing, and/or detection process. As a further example, the battery powered device 170 and/or the connection, pairing, and/or detection process could be activated at a shipping facility (e.g., by a shipping facility device) or retail store (e.g., by a point of sale device), or by other means.

In some embodiments, the battery powered device 170 uses one or more settings to determine which wireless network to connect to, pair to, and/or detect, and/or to determine network credentials to use to connect to or pair to a wireless network. The one or more settings may be stored on the battery powered device 170 using approaches described above. For example, the one or more settings could include network information for a wireless network associated with the user 112, such as the user-defined network credentials described herein.

In various embodiments, based at least in part on (e.g., in response to) the battery powered device 170 connecting to, pairing to, and/or detecting the wireless network, the user 112 may receive one or more notifications, or alerts (which may correspond to a message(s) 416 later described in further detail). For example, a notification may alert the user 112 that the package 122 is delivered (e.g., via e-mail and/or a push notification to the first client device 114A). Additionally or alternatively, a notification could alert the user 112 based at least in part on the package 122 being moved (e.g., indicating potential package theft). In some embodiments, the notification may be based on or in response to the battery powered device 170 detecting disconnection from a wireless network. Additionally or alternatively, the notification may be based on the battery powered device 170 determining a signal strength from the wireless network is below a threshold value. Additionally or alternatively, the notification may be based on the battery powered device 170 detecting motion using one or more motion sensors of the battery powered device 170, such as one or more gyroscopes and/or accelerometers.

The first A/V device 110A is shown as a video doorbell, and the second A/V device 110B is shown as a floodlight controller, by way of example only. For example, the first A/V device 110A and the second A/V device 110B may be located proximate an entryway of the building 120, such as a front door, a back door, etc., or elsewhere. Where the present disclosure may provide numerous examples of methods and systems with respect to particular A/V devices, such as video doorbells or floodlight controllers, the present embodiments are equally applicable for a variety of electronic devices, including one or more A/V recording and communication security cameras. Further, while A/V devices are described, the present disclosure relates more broadly to image and/or video recording and communication devices, which may or may not include audio functionally. Image and/or video recording and communication devices in accordance with the present disclosure may include substantially all of the structure and/or functionality of the doorbells, security cameras, and/or floodlight controllers described herein, but may not include audio components and/or functionality. In some examples, the devices may not include video and may only include audio. In such examples, the device may include a microphone and/or one or more sensors, such as temperature sensors, moisture sensors, etc.

Embodiments of the present disclosure need not be limited to A/V devices, and may more generally be implemented using electronic devices, such as electronic devices having network functionality. For example, embodiments may include smart home devices and/or automation devices, such as automation devices 206 further described below with reference to FIG. 2. Additionally, FIGS. 1A and 1B provide an example of the system 100 that includes various devices. However, one or more of the devices may not be required in various embodiments. For example, the second A/V device 110B, the first client device 114A, the second client device 114B, and/or one or more of the network devices 138 may not be used.

Figure 2:
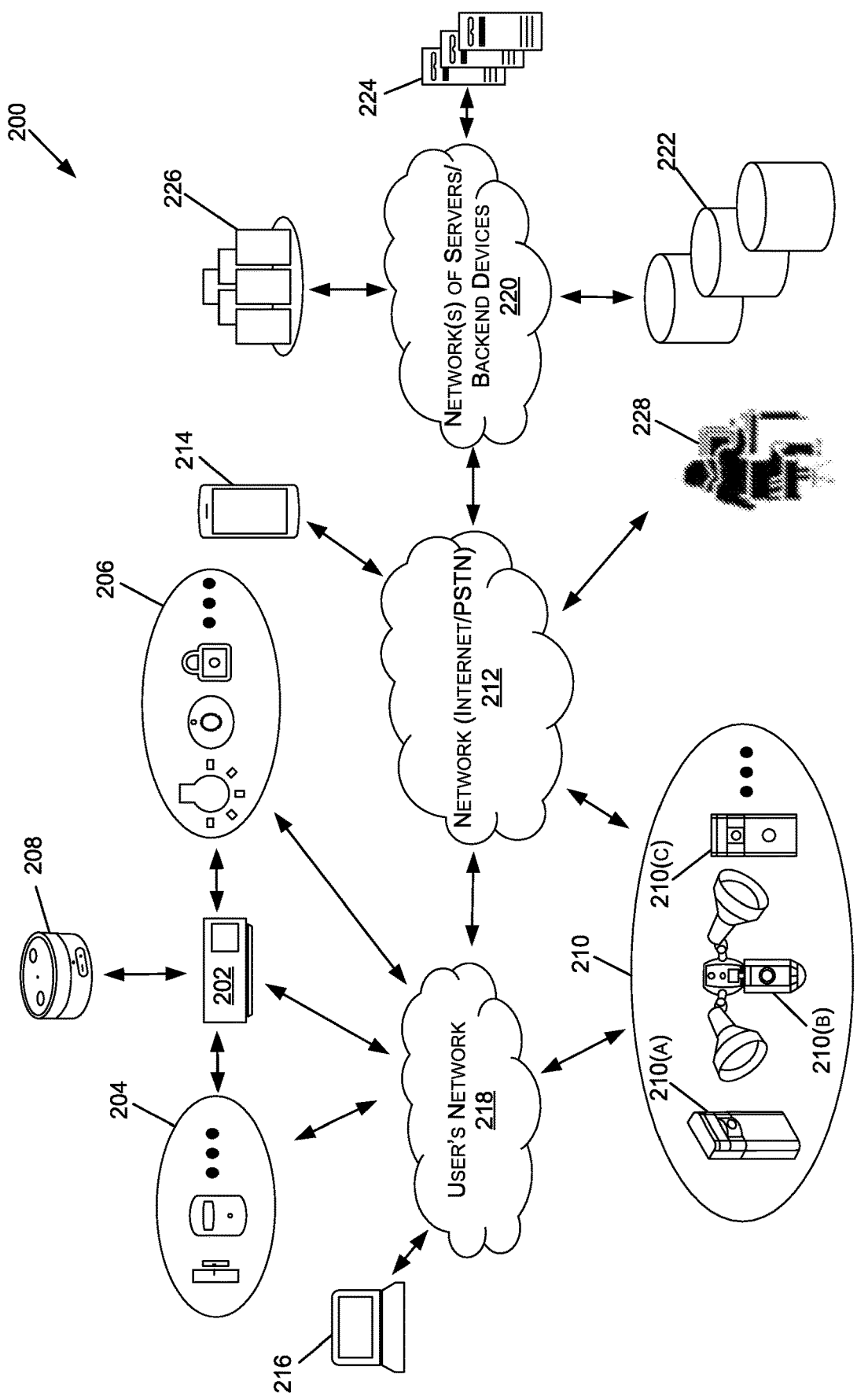
FIG. 2 is a functional block diagram illustrating a system for communicating in a network according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, etc.), when remotely monitored and controlled via a network (Internet/a public switched telephone network (PSTN)) 212 (which may be similar to, and represent the network 118), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, and/or the client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), Zig-Bee, Z-Wave, and/or an LPWAN, such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (which may alternatively be referred to herein as "A/V devices 210" or "A/V device 210"). The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or video data. The A/V devices 210 may be configured to access the user's network 218 to connect to the network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a smart-home hub device 202 (which may alternatively be referred to herein as the "hub device 202") connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, and/or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216. The client devices 214, 216 may communicate with and/or be associated with (e.g., capable of access to and control of) the A/V devices 210, the smart-home hub device 202, the VA device 208, the sensors 204, and/or the automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more backend servers 224, and one or more backend application programming interfaces (APIs) 226. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226.

The backend server 224 may comprise a computer program or other computer executable code that, when executed by a processor of the backend server 224, causes the backend server 224 to wait for requests from other computer systems or software (clients) and provide responses. In an embodiment, the backend server 224 shares data and/or hardware and/or software resources among the client devices 214, 216. This architecture is called the client-server model. The client devices 214, 216 may run on the same computer or may connect to the backend server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based at least in part on application-layer network protocols. Each service may be provided by a server component (e.g., the backend server 224) running on one or more computers (such as a dedicated server computer offering multiple services) and accessed via a network by client components running on other devices (e.g., the client devices 214, 216). However, the client and server components may both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220 (and/or the user's network 218) (and/or the network (Internet/PSTN) 212) may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite systems (GNSS), such as global positioning systems (GPS), CDPD (cellular digital packet data), RIM (Research in Motion, Limited) duplex paging network, Bluetooth radio, or an IEEE 802.11-based radio frequency network. The network may further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, and/or any of the components of the network(s) of servers/backend devices 220 (e.g., the backend server 224, the backend API 226, the storage devices 222, etc.) may be referred to herein as a "network device" or "network devices".

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control their own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

In some examples, one or more components of the computing system 100 of FIGS. 1A and 1B may correspond to one or more components of the system 200 of FIG. 2. For example, the first client device 114A and/or the second client device 114B of FIGS. 1A and 1B may include similar components and/or functionality as the client devices 214, 216 of FIG. 2, the network device(s) 138 of FIGS. 1A and 1B may include similar components and/or functionality as the hub device 202, the VA device 208, and/or any of the components of the network(s) of servers/backend devices 220 (e.g., the backend server 224, the backend API 226, the storage devices 222, etc.) of FIG. 2, and/or the network 118 of FIGS. 1A and 1B may include similar components and/or functionality as one or more of the networks 218, 212, and 220. In embodiments where the building 120 includes at least one of the network devices 138, the network devices 138 may correspond to the hub device 202 and/or the VA device 208, as examples. Further, the first A/V device 110A and/or the second A/V device 110B of may include similar components and/or functionality as the one or more A/V devices 210.

Figure 3:
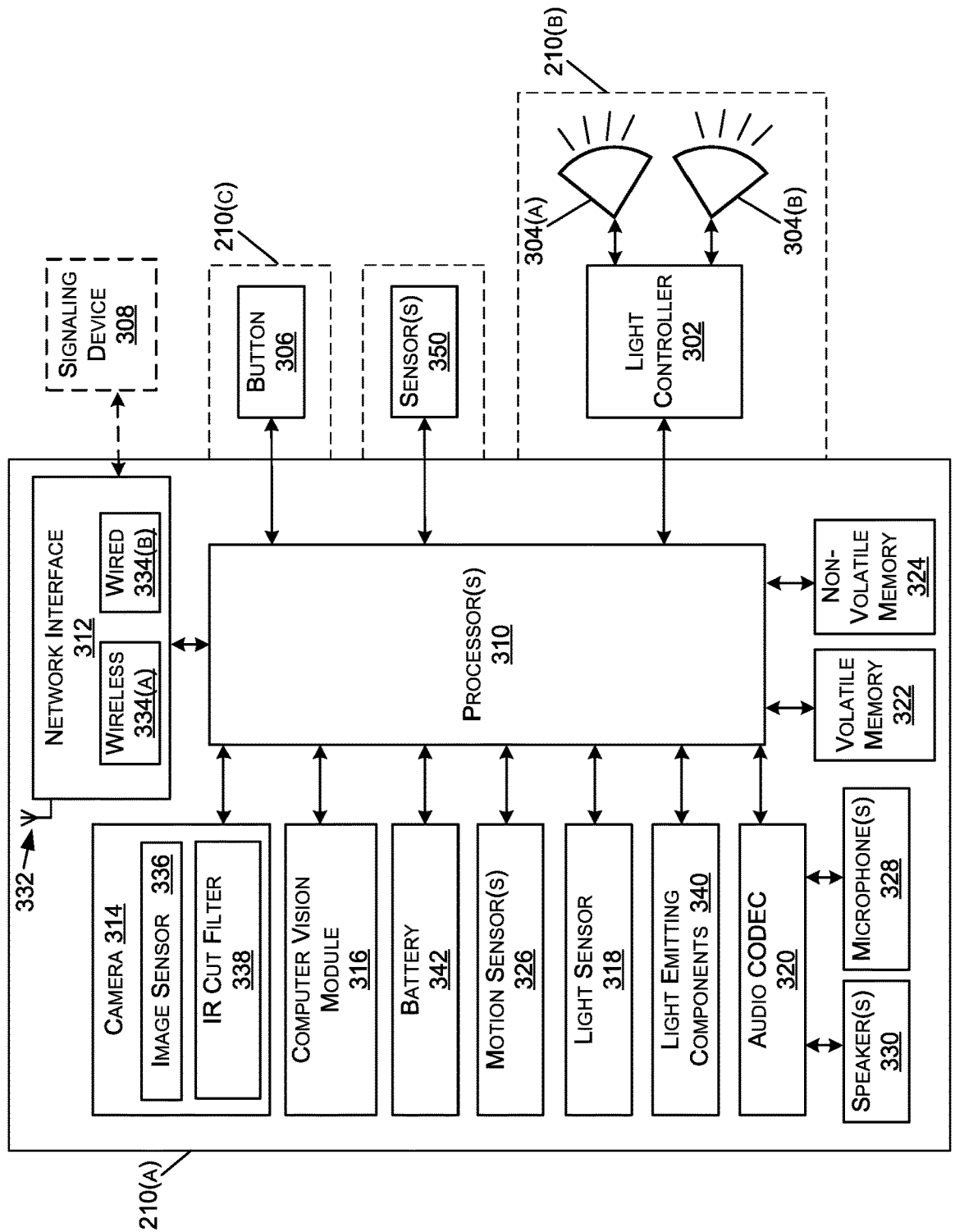
FIG. 3 is a functional block diagram of an A/V device according to various aspects of the present disclosure.

FIG. 3 is a functional block diagram for an audio/video (A/V) device according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or another wireless communication protocol). Although the A/V recording and communication device 210 (or A/V device 210) is referred to herein as an "audio/video" device, the A/V device 210 need not have both audio and video functionality. For example, the A/V device 210 may not include the speakers 330, microphones 328, and/or audio CODEC. In such examples, the A/V device 210 may only have video recording and communication functionalities. In other examples, the A/V device 210 may only have the speaker 330 and not the microphones 328, or may only have the microphones 328 and not the speakers 330.

With further reference to FIG. 3, the A/V device 210 may include a processor(s) 310, a network interface 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller) may comprise an integrated circuit including a processor core, memory, and programmable input/output peripherals. The processor(s) 310 may receive input signals, such as data and/or power, from the camera 314, motion sensor(s) 326, the light sensor 318, microphone(s) 328, speaker(s) 330, and/or the network interface 312, and may perform various functions as described in the present disclosure. In various embodiments, when the processor(s) 310 is triggered by the motion sensor(s) 326, the camera 314, the speaker(s) 330, the microphone(s) 328, the network interface 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the network interface 312 and the camera 314.

With further reference to FIG. 3, the network interface 312 may comprise an integrated circuit including a processor core, memory, and programmable input/output peripherals. The network interface 312 may be operatively connected to the processor(s) 310. In some embodiments, the network interface 312 is configured to handle communication links between the A/V device 210 and other, external devices, external receivers, external transmitters, and/or external transceivers, and to route incoming/outgoing data appropriately. For example, inbound data from an antenna 332 of the network interface 312 may be routed through the network interface 312 before being directed to the processor(s) 310, and outbound data from the processor(s) 310 may be routed through the network interface 312 before being directed to the antenna 332 of the network interface 312. As another example, the network interface 312 may be configured to transmit data to and/or receive data from a remote network device (e.g., one or more components of the network(s) of servers/backend devices 220 described in FIG. 2). The network interface 312 may include wireless 334(a) and wired 334(b) adapters. For example, the network interface 312 may include one or more wireless antennas, radios, receivers, transmitters, and/or transceivers (not shown in FIG. 3 for simplicity) configured to enable communication across one or more wireless networks, for example and without limitation, Wi-Fi (e.g., the user's network 218), X10, Ethernet, RS-485, 6LoWPAN, Bluetooth LE (BLE), ZigBee, Z-Wave, and/or an LPWAN, such as a CSS modulation technology network (e.g., LoRaWAN), an Ultra Narrow Band modulation technology network (e.g., Sigfox, Telensa, NB-IoT, etc.), RingNet, and/or the like.

The various communications described herein as being received by and/or transmitted from the A/V devices 210, or more generally electronic devices, such as smart home devices, can be accomplished using any combination of these wireless technologies (e.g., an LPWAN and/or Ultra Narrow Band modulation technology network such as RingNET). For example, as described herein, in some embodiments, a smart home device (e.g., the A/V device 110B) transmits at least some of the user-defined settings to another smart home device (e.g., the A/V device 110A) to configure that device according to the user-defined settings. The user-defined settings may or may not be used to update previous settings on the smart home device and may or may not be associated with an installation procedure of the smart home device. Further, the user-defined settings may be used to configure any number of smart home devices and may be transmitted to any number of smart home devices from other smart home devices and/or client devices. For example, in some embodiments, a client device (e.g., the client device 114A) or another device such as the network devices 138 provides one or more user-defined settings to a smart home device (e.g., the A/V device 110B). This may optionally occur using a first wireless technology such as Bluetooth or WIFI. The A/V device 110B may then provide at least one of the user-defined settings to any number of other smart home devices, and those smart home devices may provide at least one of the user-defined settings to any number of other smart home devices. This may occur using a second wireless technology such as an LPWAN and/or Ultra Narrow Band modulation technology network such as RingNET and any combination of the smart home device may or may not implement the at least one of the user-defined settings. Using this approach, updated settings may be disseminated and applied to multiple smart home devices. For example, a user of the client device may selectively apply the settings to multiple devices in a GUI and those changes may be automatically implemented. Various approaches to authentication may be used to ensure a smart home device providing settings to another smart home device is a trusted device.

The network interface 312 may receive inputs, such as power and/or data, from the camera 314, the processor(s) 310, the button 306 (in embodiments where the A/V device 210 is the video doorbell 210(c)), the motion sensors 326, a reset button (not shown in FIG. 3 for simplicity), and/or the non-volatile memory 324. The network interface 312 may also include the capability of communicating over wired connections, such as with the signaling device 308. For example, when the button 306 of the video doorbell 210(c) is pressed, the network interface 312 may be triggered to perform one or more functions, such as to transmit a signal over the wired 334(b) connection to the signaling device 308 (although, in some embodiments, the signal be transmitted over a wireless 334(a) connection to the signaling device) to cause the signaling device 308 to emit a sound (e.g., a doorbell tone, a user customized sound, a ringtone, a seasonal ringtone, etc.). The network interface 312 may also act as a conduit for data communicated between various components and the processor(s) 310.

The network interface 312 may include a low-power network interface (e.g., a low-power wide-area network interface), and/or a high-power network interface (e.g., Wi-Fi network interface). Where the network interface 312 includes both a low-power network interface and a high-power network interface, they may be implemented using discrete, hybrid, or integrated hardware components.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the image sensor 336 may comprise a complementary metal-oxide semiconductor (CMOS) array and may be capable of recording high definition (e.g., 722p, 1080p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the network interface 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the network interface 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the network interface 312 to the network 212 via the user's network 218, routed by the backend server 224 and/or the backend API 226 and delivered to the client device(s) 214, 216 as described above in connection with FIG. 2. When the user speaks, after being transferred through the network 212, the user's network 218, and the network interface 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, the battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210. In some embodiments, one or more of the accelerometer, the barometer, the humidity sensor, and the temperature sensor are used to generate ambient condition data, as described herein.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in their field of view and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based at least in part on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, package, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that may interface with other thought processes and elicit appropriate action. This image understanding may be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data may take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes may be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based at least in part on relatively simple and fast computations is sometimes used for finding smaller regions of interesting image data that may be further analyzed by more computationally demanding techniques to produce a correct interpretation.

Several specialized tasks based at least in part on computer vision recognition exist, such as: Optical Character Recognition (OCR)— Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)— Differentiating human beings (e.g., head and shoulder patterns) from objects.

Image acquisition— A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but may also be related to various physical measures, such as depth, absorption or reflectance of sonic or electromagnetic waves, or nuclear magnetic resonance.

Pre-processing—Before a computer vision method may be applied to image data in order to extract some specific piece of information, it is usually beneficial to process the data in order to assure that it satisfies certain assumptions implied by the method. Examples of pre-processing include, but are not limited to, re-sampling in order to assure that the image coordinate system is correct, noise reduction in order to assure that sensor noise does not introduce false information, contrast enhancement to assure that relevant information may be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based at least in part on template matching techniques applied to a set of salient facial features, providing a sort of compressed face representation.

Recognition algorithms may be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It may also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors may be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that may be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers may be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics. Present embodiments may use any one, or any combination of more than one, of the foregoing biometrics to identify and/or authenticate a delivery agent, such as the delivery agent 104 of FIGS. 1A and 1B.

While various processes are discussed with respect to the A/V device 210, any combination of these processes may be performed additionally, or alternatively, by the backend server(s) 224, the hub device(s) 202, and/or the backend API 226.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motions sensor(s) 326 and/or the camera 314 detecting motion, the light controller 302 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the network interface 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the network interface 312, to the client device(s) 214, 216 to indicate to the user(s) of the client device(s) 214, 216 that a person is present at the A/V device 210 (in some embodiments, via at least one of the hub device 202, the VA device 208, and/or one or more component of the network of servers/backend devices 220).

Figure 4:
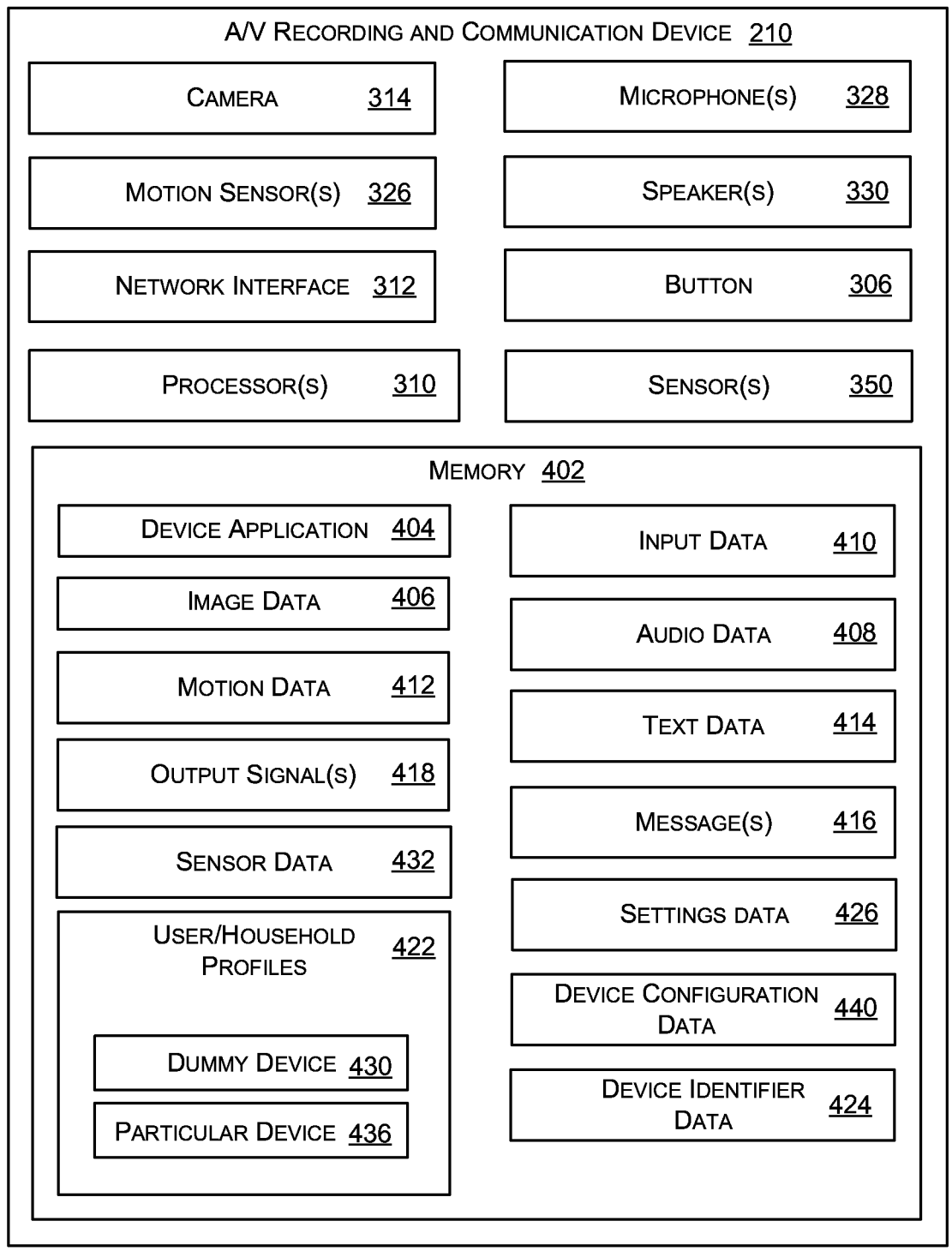
FIG. 4 is a functional block diagram illustrating one example embodiment of an A/V recording and communication device according to various aspects of the present disclosure.

FIG. 4 is another functional block diagram illustrating an embodiment of an A/V device 210 according to various aspects of the present disclosure. In some embodiments, the A/V device 210 may represent, and further include one or more of the components from, the A/V recording and communication doorbell 210(c), the A/V recording and communication security camera 210(a), and/or the floodlight controller 210(b). Additionally, in some embodiments, the A/V device 210 may omit one or more of the components shown in FIG. 4 and/or may include one or more additional components not shown in FIG. 4. In some examples, the A/V device 210 may generally correspond to and have functionality similar to the A/V devices 110A and/or 110B described in FIGS. 1A and 1B. Thus, the A/V device 210 may include all of the functionality, or some of the functionality, or any combination of functionality described for the A/V devices 110A, 110B.

As shown in FIG. 4, the A/V device 210 includes memory 402, which may represent the volatile memory 322 and/or the non-volatile memory 324. The memory 402 stores settings data 426, which may correspond to one or more of the settings 130 described with respect to FIGS. 1A and 1B. The memory 402 further stores device configuration data 440 and a device application 404. The device configuration data 440 may control how the A/V device 210 operates, and the device application 404 may include instructions that, when executed by the processor(s) 310, cause the processor(s) to apply one or more of the settings captured by the settings data 426 to the device configuration data 440 to set and/or modify how the A/V device 210 will operate.

In various embodiments, the device application 404 may include instructions that, when executed by the processor(s) 310, cause the processor(s) to capture image data 406 using the camera 314, audio data 408 using the microphone(s) 328, input data 410 using the button 306 (and/or the camera 314 and/or the motion sensor(s) 326, depending on the embodiment), sensor data 432 using the sensor(s) 350 and/or motion data 412 using the camera 314 and/or the motion sensor(s) 326 (e.g., in accordance with the one or more settings captured by the settings data 426). In some embodiments, the device application 404 may include instructions that, when executed by the processor(s) 310, cause the processor(s) to generate text data 414 describing the image data 406, the audio data 408, and/or the input data 410, such as in the form of metadata (including timestamp data), for example (e.g., in accordance with the one or more settings captured by the settings data 426).

In addition, the device application 404 may include instructions that, when executed by the processor(s) 310, cause the processor(s) to transmit the image data 406, the audio data 408, the motion data 412, the sensor data 432, the input data 410, the text data 414, and/or message(s) 416 to the client devices 214, 216, the hub device 202, another A/V device 210, and/or the backend server 224 using the network interface 312 (e.g., in accordance with the one or more settings captured by the settings data 426). In various embodiments, the device application 404 may include instructions that, when executed by the processor(s) 310, cause the processor(s) to generate and transmit an output signal 418 that may include the image data 406, the audio data 408, the sensor data 432, the motion data 412, the input data 410, the text data 414, and/or device identifier data 424. In some of the present embodiments, the output signal 418 may be transmitted to the backend server 224 (e.g., the network device(s) 138) and/or the hub device 202 using the network interface 312, and the backend server 224 and/or the hub device 202 may transmit (or forward) the output signal 418 to the client device 214, 216 and/or the backend server 224 may transmit the output signal 418 to the hub device 202. In other embodiments, the output signal 418 may be transmitted directly to the client device 214, 216 and/or the hub device 202.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 and represent a field of view of the camera 314. The image data 406 may be captured using cameras of any combination of the first A/V device 110A and the second A/V device 110B of FIGS. 1A and 1B (e.g., in accordance with the one or more settings captured by the settings data 426). For example, where the A/V device 210 corresponds to the first A/V device 110A of FIGS. 1A and 1B, the image data 406 may be captured by the camera of the first A/V device 110A. Similarly, where the A/V device 210 corresponds to the second A/V device 110B of FIGS. 1A and 1B, the image data 406 may be recorded by the camera of the second A/V device 110B.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based at least in part on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell, the A/V device 210 may not include the button 306, and the A/V device 210 may not generate the input data 410.

The device application 404 may include instructions that, when executed by the processor(s) 310, cause the processor(s) to evaluate a trigger condition(s) to trigger identification and/or capture of one or more portions of the sensor data 432, the image data 406, the audio data 408, and/or the motion data 412, based at least in part on one or more settings captured by the settings data 426.

In some examples, the device application 404 may include instructions that, when executed by the processor(s) 310, cause the processor(s) to analyze the image data 406 using computer vision processing and/or image processing (e.g., in accordance with one or more settings captured by the settings data 426). The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

With further reference to FIG. 4, the message(s) 416 may be generated by the processor(s) 310 and transmitted, using the network interface 312, to the client device 214, 216, the backend server 224, the hub device 202, and/or another device (e.g., in accordance with one or more settings captured by the settings data 426). Additionally, or alternatively, one or more of the messages 416 may be representative of a request and/or delivery instructions outputted by the speaker(s) 330 of the A/V device 210 and/or other devices, such as the client device 214, 216. In some of the present embodiments, the message 416 may include on or more of the image data 406, the audio data 408, the motion data 412, the sensor data 432, the input data 410, the text data 414, and the device identifier data 424.

As described herein, the message(s) 416 may include messages, signals, data, notifications, and/or any type of electronic communication that electronic devices (e.g., the A/V device 210, the client device 214, 216, the hub device 202, and/or the backend server 224) may transmit and receive with other electronic devices (e.g., the A/V device 210, the client device 214, 216, the hub device 202, and/or the backend server 224). For example, message(s) 416 may include push notifications, email messages, short message service (SMS) messages, multimedia messages (MMS), voicemail messages, audio signals, and/or any other type of electronic communication that an electronic device may transmit to another electronic device.

As further illustrated in FIG. 4, the memory 402 stores user and/or household profiles 422 for users of a service provider. The user/household profiles 422 may indicate what A/V devices 210 (e.g., the A/V devices 110A, 110B) are associated with a particular user and/or household, what client devices 214, 216, and/or 114B are associated with a particular user and/or household, what hub devices 202 are associated with a particular user and/or household, what locations and/or areas are part of the user's property or otherwise are associated with the user, and/or names or labels (e.g., side of house) for the locations and/or areas associated with the user.

Control signal(s) 434 may include messages, signals, data, notifications, and/or any type of electronic communication that electronic devices (e.g., the A/V device 210, the client device 214, 216, the hub device 202, and/or the backend server 224) may transmit and receive with other electronic devices (e.g., the A/V device 210, the client device 214, 216, the hub device 202, and/or the backend server 224) to control various electronic devices. An activation message is an example of a control signal. For example, the control signal(s) 434 may include push notifications, email messages, short message service (SMS) messages, multimedia messages (MMS), voicemail messages, audio signals, and/or any other type of electronic communication that an electronic device may transmit to another electronic device.

As mentioned above, the device configuration data 440 may control how the A/V device 210 operates and the device application 404 may include instructions that, when executed by the processor(s) 310, cause the processor(s) to apply one or more of the settings captured by the settings data 426 to the device configuration data 440 to set and/or modify how the A/V device 210 will operate.

The device application 404 may include instructions that, when executed by the processor(s) 310, cause the processor(s) to receive the settings data 426 from one or more of the client devices 214, 216, the hub device 202, another A/V device 210, and/or the backend server 224 using the network interface 312 (e.g., in one or more of the messages 416). For example, the settings data 426 may be received as part of the installation procedure mentioned above with respect to the first A/V device 110A of FIG. 1A. Further, the device application 404 may include instructions that, when executed by the processor(s) 310, cause the processor(s) to configure the A/V device 210 using data corresponding to one or more of the settings 130 received in the settings data 426 (e.g., as part of the installation procedure). This process may include applying the one or more of the settings 130 to the device configuration data 440 and/or the user/household profile 422.

The settings data 426 may be received based at least in part on the A/V device 210 transmitting data indicating the installation procedure of the A/V device 210 (e.g., in one or more of the output signals 418). In some embodiments, the device application 404 may include instructions that, when executed by the processor(s) 310, cause the processor(s) to transmit the data indicating the installation procedure to one or more of the client devices 214, 216, the hub device 202, another A/V device 210, and/or the backend server 224 using the network interface 312. As one example, the data may include device identifier data 424, which may include data representative of the device identifier of the A/V device 210. Additionally or alternatively, the data may include data representative of an API call corresponding to the installation procedure. In some embodiments, the data indicating the installation procedure may be included in the beacon signal described above.

A data packet of a beacon may include, for example, data representative of a preamble, the device identifier of the first A/V device 110A, a clock sync, and a time slot for the first A/V device 110A to communicate with the another device. The other device may determine to use the time slot, based on the data packet including the device identifier, to provide the settings data 426. As an example, a beacon may be sent out periodically, such one-time per second, two times per second, three times per second, ten times per second, fifty times per second, etc., depending on the embodiment. Further, the time slots may be, for example, approximately fifty milliseconds, one-hundred milliseconds, one-hundred-fifty milliseconds, two-hundred milliseconds, two-hundred-fifth milliseconds, etc., for low data rate (e.g., approximately 1 kbit/s, 2 kbit/s, 3 kbit/s, or 5 kbit/s), depending on the embodiment. The time slots may be, for example, approximately five milliseconds, ten milliseconds, fifteen milliseconds, etc., for high data rate (e.g., approximately 40 kbit/s, 50 kbit/s, 60 kbit/s), depending on the embodiment.

The A/V device 210 may include the user/household profile(s) 422. Further, the user/household profile(s) 422 may include a list of electronic devices associated with a user account, such as the dummy device(s) 430, which may include the dummy device 140 of FIG. 1A, and/or the particular device(s) 436, which may include the particular device 144 of FIG. 1A. In embodiments where the A/V device 210 corresponds to the second A/V device 110B of FIG. 1A, the device application 404 may include instructions that, when executed by the processor(s) 310, cause the processor(s) to configure the A/V device 210 to, based at least in part on the receiving of the data indicating an installation procedure of the first A/V device 110A, transmit at least some of the settings data 426 representative of the user-defined settings to cause configuration of at least some of the user-defined settings on the first A/V device 110A. As an example, the transmitting may be based on the data indicating an installation procedure and data that registers the device identifier represented by the device identifier data 424 with the dummy device.

The data that registers the device identifier represented by the device identifier data 424 with the dummy device may be included in the user/household profile(s) 422 and the device application 404 may include instructions that, when executed by the processor(s) 310, cause the processor(s) to compare the data to the device identifier data 424 to determine the same device identifier is represented by both data. The device application 404 may include instructions that, when executed by the processor(s) 310, cause the processor(s) to transmit the settings data 426 to the first A/V device 110A based on the comparison indicating a match between the data. Additionally or alternatively, any combination of the user account data described above may be used to infer the identity of the first A/V device 110A and/or the installation procedure is authorized to determine to provide the settings data 426 to the first A/V device 110A.

As indicated above, the data used to register the device identifier represented by the device identifier data 424 with the dummy device (and/or the user account data) may be received in one or more of the messages 416 from one or more of the client devices 214, 216, the hub device 202, another A/V device 210, and/or the backend server 224 using the network interface 312.

Figure 5:
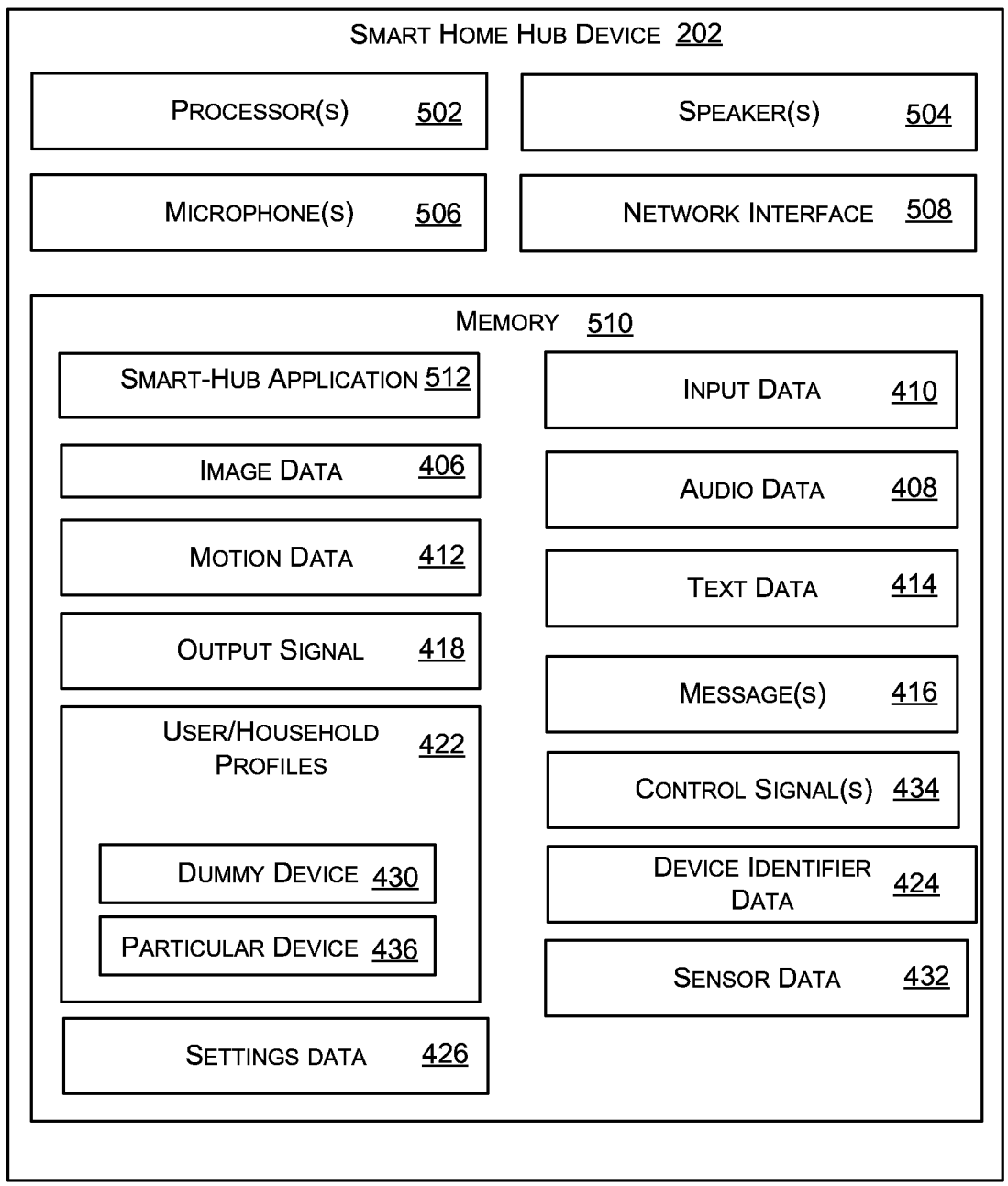
FIG. 5 is a functional block diagram illustrating one example embodiment of a smart-home hub device according to various aspects of the present disclosure.

FIG. 5 is a functional block diagram illustrating an embodiment of the smart-home hub device 202 (alternatively referred to herein as the "hub device 202") according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. Further, the hub device 202 may be configured to perform some, or all, of the operations of the network device(s) 138 described in FIGS. 1A and 1B. The hub device 202 may comprise processor(s) 502 (which may be similar to, and/or include similar functionality as, the processor(s) 310) that are operatively connected to speaker(s) 504, microphone(s) 506, a network interface 508 (which may be similar to, and/or include similar functionality as, the network interface 312), and memory 510 (which may be similar to, and/or include similar functionality as, the memory 402). In some embodiments, the hub device 202 may further comprise one or more of a camera (not shown). In some embodiments, the hub device 202 may not include one or more of the components shown in FIG. 5, such as the speaker(s) 504 and/or the microphone(s) 506.

As shown in the example of FIG. 5, the memory 510 stores a smart-home hub application 512. In various embodiments, the smart-home hub application 512 may include instructions that, when executed by the processor(s) 502, cause the processor(s) to receive sensor data from the sensors 204, the sensors 350, and/or the automation devices 206, which may include one or more stand-alone sensors and/or sensors integrated into another device. For example, sensor data from the sensors 204 (and/or the sensor data 432 from the sensor(s) 350) may include a current state (e.g., opened/closed for door and window sensors, motion detected for motion sensors, living room lights on/off for a lighting automation system, rain or snow present/not present for a precipitation sensor, etc.) of each of the sensors 204, the sensors 350, and/or the automation devices 206. In some of the present embodiments, the sensor data may be received in response to sensor triggers. The sensor triggers may be a door opening/closing, a window opening/closing, lights being turned on/off, blinds being opened/closed, etc. As such, the sensor data may include a current state of the sensors 204, the sensors 350, and/or the automation devices 206 as well as any updates to the current state based at least in part on sensor triggers.

With further reference to FIG. 5, the smart-home hub application 512 may include instructions that, when executed by the processor(s) 502, cause the processor(s) to receive the image data 406, the settings data 426, the audio data 408, the motion data 412, the sensor data 432, the input data 410, the text data 414, device identifier data 424, the message(s) 416 and/or the control signal(s) 434 from the A/V device 210 (in some embodiments, via the backend server 224, and in some embodiments from the backend server 224 instead of the A/V device 210), the client device 214, 216, etc., using the network interface 508. Where multiple A/V devices are employed, such as the first A/V device 110A and the second A/V device 110B of FIG. 1B, one or more portions of the data may be received from either of the A/V devices.

As described herein, at least some of the processes of the A/V device 210, the backend server 224, and/or the client device 214, 216 may be executed at least partially by the hub device 202. For example, the smart-home hub application 512 may include instructions that, when executed by the processor(s) 502, cause the processor(s) to receive, using the network interface 508, data representative of a request to associate the dummy device(s) 430 with the user account (e.g., in a message 416), based at least in part on the receiving of the data, associate the dummy device(s) 430 with the user account (e.g., in the user/household profile 422), receiving, using the network interface 508, data representative of a request to register, using the device identifier of the first A/V device 110A, the first A/V device 110A as a dummy device 430 (e.g., in a message 416), receive, using the network interface 508, the data indicating the installation procedure of the first A/V device 110A (e.g., in a message 416), and/or based at least in part on the receiving of the data indicating an installation procedure and the data that registers the device identifier with the dummy device 430, transmitting at least some of the settings data 426 representative of the user-defined settings (e.g., in an output signal 418), the transmitting of the data causing configuration of at least some of the user-defined settings on the first A/V device 110A.

Figure 6:
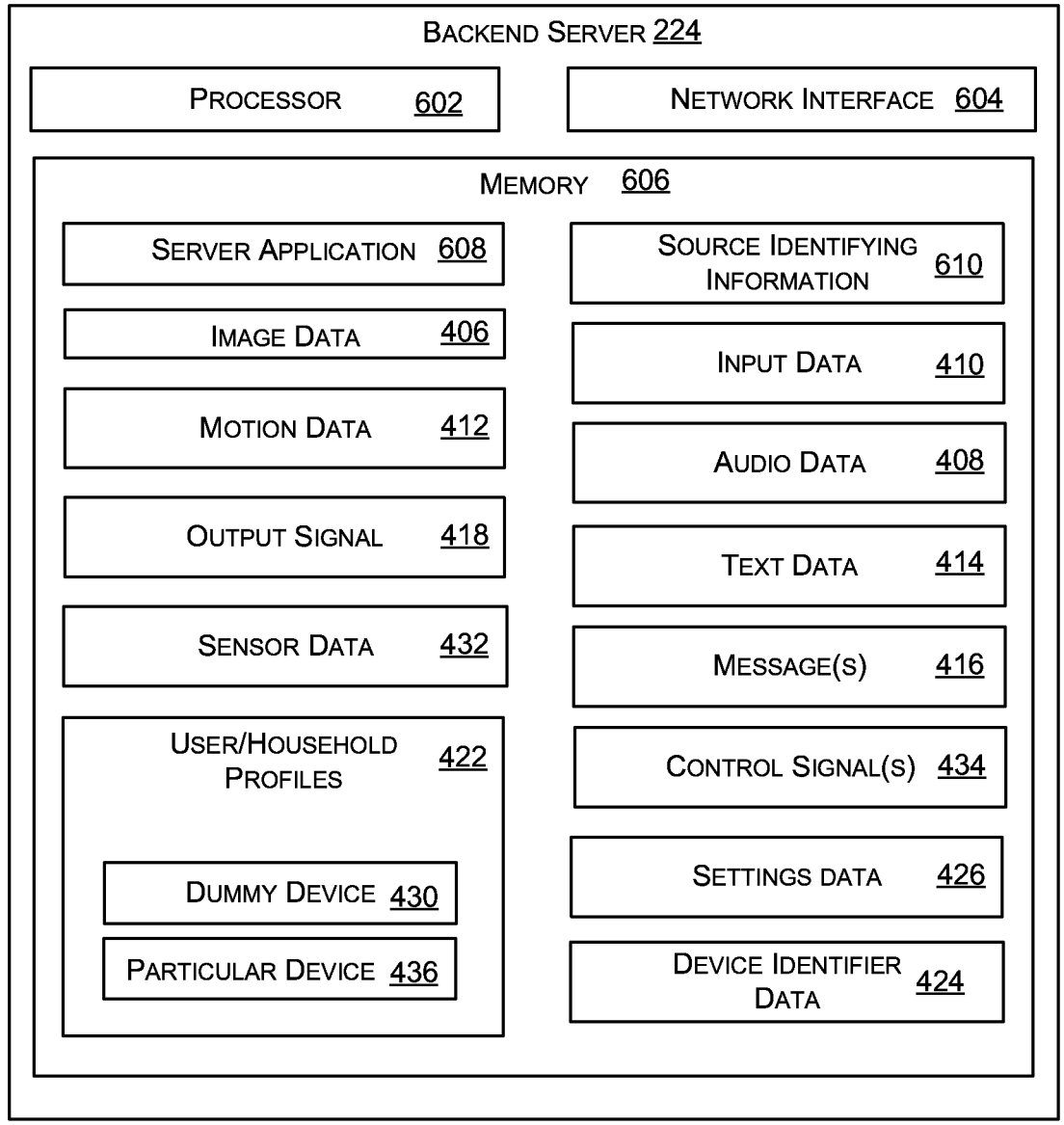
FIG. 6 is a functional block diagram illustrating one example embodiment of a backend device according to various aspects of the present disclosure.

FIG. 6 is a functional block diagram illustrating one embodiment of the backend server 224 (e.g., one or more of the network device(s) 138) according to various aspects of the present disclosure. The backend server 224 may comprise processor(s) 602 (which may be similar to, and/or include similar functionality as, the processor(s) 310), a network interface 604 (which may be similar to, and/or include similar functionality as, the network interface 312), and a memory 606 (which may be similar to, and/or include similar functionality as, the memory 402). The network interface 604 may allow the backend server 224 to access and communicate with devices connected to the network (Internet/PSTN) 212 (e.g., the A/V device 210, the hub device 202, the client devices 214, 216, a device controlled by the security monitoring service 228, and/or other the electronic device(s)).

The memory 606 may include a server application 608 that includes instructions that, when executed by the processor(s) 502, cause the processor(s) to receive and/or retrieve (using the network interface 604) the image data 406, the audio data 408, the motion data 412, the sensor data 432, the input data 410, the text data 414, the device identifier data 424, the settings data 426, the message(s) 416 and/or the control signal(s) 434 from the A/V device 210 (e.g., in the output signal 418), the client device 214, 216, and/or the hub device 202. The server application 608 may also include instructions that, when executed by the processor(s) 602, cause the processor(s) to transmit (and/or forward) the image data 406, the device identifier data 424, the settings data 426, the audio data 408, the motion data 412, the sensor data 432, the input data 410, the text data 414, the message(s) 416 and/or the control signal(s) 434 to the client devices 214, 216 using the network interface 604.

Although referred to as the backend server 224 with reference to the processes described herein, the backend server 224 may additionally, or alternatively, include one or more of the devices from the network(s) of servers/backend devices 220. For example, the processes described herein with respect to the backend server 224 may additionally, or alternatively, at least in part, be performed by one or more backend APIs 226.

In further reference to FIG. 6, the memory 606 may also include source identifying data 610 that may be used to identify the A/V device 210, at least one other electronic device (e.g., a second A/V device 210), the hub device 202, and/or the client devices 214, 216. In addition, the server application 608 that includes instructions that, when executed by the processor(s) 502, cause the processor(s) to use the source identifying data 610 to determine the client devices 214, 216 are associated with the A/V device 210 and/or the hub device 202.

In some embodiments, the server application 608 includes instructions that, when executed by the processor(s) 502, cause the processor(s) to generate and transmit a report signal (not shown) to a third-party client device (e.g., similar to the first client device 114A), which may be associated with a third-party, as described herein, such as a delivery provider, a package provider, and/or a security company or the security monitoring service 228, for example. The report signal, in some examples, may be the message 416.

As described herein, at least some of the processes of the A/V device 210 (e.g., A/V device(s) 110A, 110B of FIGS. 1A and 1B), the hub device 202, the network device(s) 138 of FIG. 1, and/or the client device(s) 214, 216 (e.g., client devices 114A, 114B of FIGS. 1A and 1B) may be executed by the backend server 224. For example, the server application 608 may include instructions that, when executed by the processor(s) 602, cause the processor(s) to receive, using the network interface 604, data representative of a request to associate the dummy device(s) 430 with the user account (e.g., in a message 416), based at least in part on the receiving of the data, associate the dummy device(s) 430 with the user account (e.g., in the user/household profile 422), receiving, using the network interface 604, data representative of a request to register, using the device identifier of the first A/V device 110A, the first A/V device 110A as a dummy device 430 (e.g., in a message 416), receive, using the network interface 604, the data indicating the installation procedure of the first A/V device 110A (e.g., in a message 416), and/or based at least in part on the receiving of the data indicating an installation procedure and the data that registers the device identifier with the dummy device 430, transmitting at least some of the settings data 426 representative of the user-defined settings (e.g., in an output signal 418), the transmitting of the data causing configuration of at least some of the user-defined settings on the first A/V device 110A.

The hub device 202 and/or the backend server 224 (and/or one or more additional or alternative components of the network(s) of servers/backend devices 220) may alternatively be referred to herein as "network device(s)." In addition, the hub device 202 and/or the backend server 224 (and/or one or more additional or alternative components of the network(s) of servers/backend devices 220) may include some or all of the components and/or functionality of the network device(s) 138 of FIGS. 1A and 1B.

Figure 7:
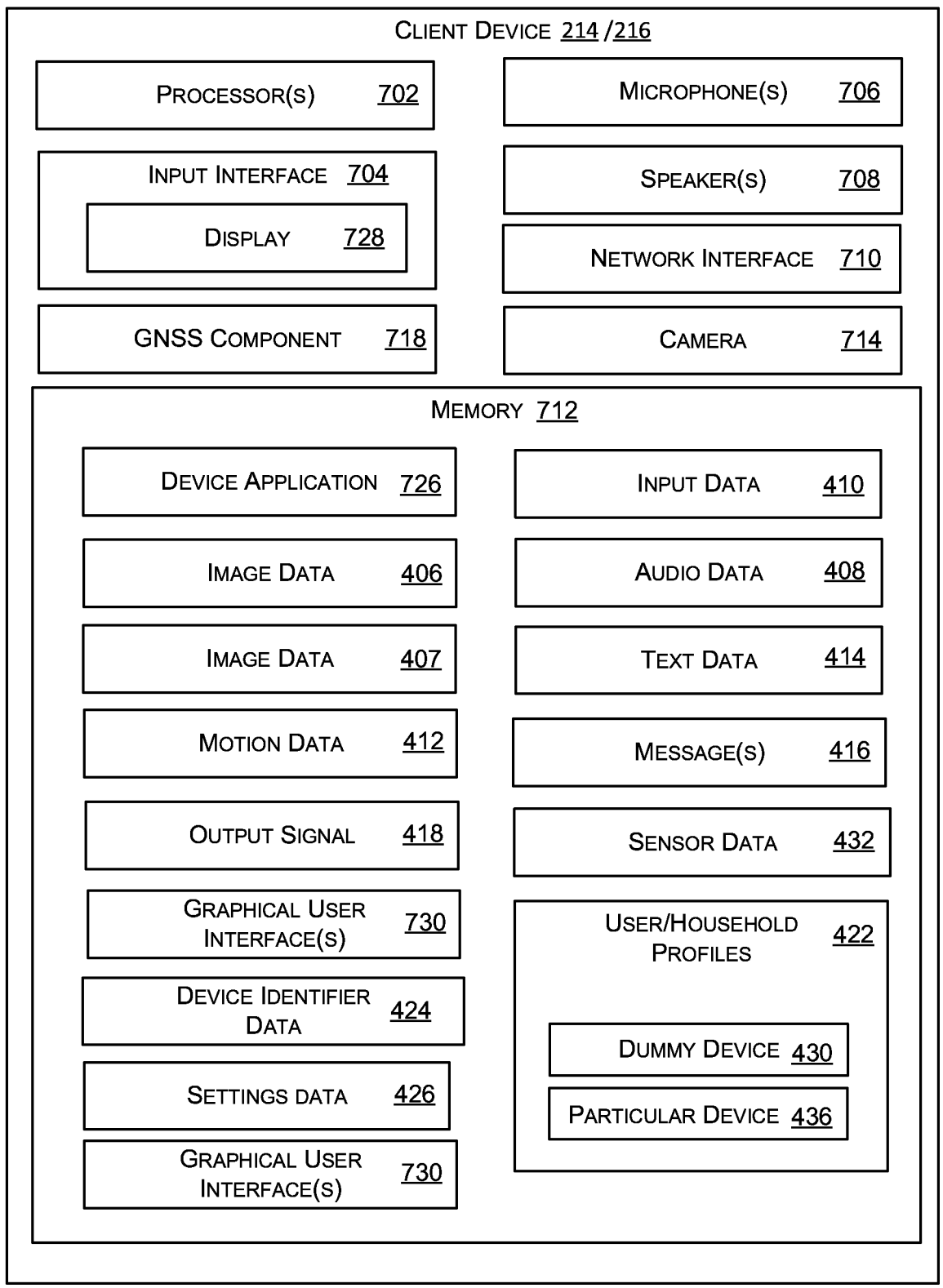
FIG. 7 is a functional block diagram illustrating one example embodiment of a client device according to various aspects of the present disclosure.

Now referring to FIG. 7, FIG. 7 is a functional block diagram illustrating one embodiment of the client device 214, 216, according to various aspects of the present disclosure. The client device 214, 216 may comprise processor(s) 702 (which may be similar to, and/or include similar functionality as, the processor(s) 310) that are operatively connected to an input interface 704, microphone(s) 706, speaker(s) 708, a network interface 710 (which may be similar to, and/or include similar functionality as, the network interface 312), a camera(s) 714, and memory 712 (which may be similar to, and/or include similar functionality as, the memory 402). The client device 214, 216 may further comprise a camera 714, a Global Navigation Satellite System (GNSS) component 718 (e.g., GNSS receiver, such as a GPS receiver), and/or another sensor type operatively connected to the processor(s) 702.

In various embodiments, the device application 726 may include instructions that, when executed by the processor(s) 702, cause the processor(s) to receive input(s) to the input interface 704 (e.g., requests to assign user-defined settings to dummy devices, live view requests, requests for changing settings of one or more components of the home security/automation system, etc.). In addition, the device application 726 may configure the processor(s) 702 to receive, using the network interface 710, the input data 410, the image data 406, the audio data 408, the output signal 418, the text data 414, the motion data 412, the device identifier data 424, the settings data 426, the sensor data 432, and/or the messages 416 from one or more of the A/V device(s) 210, the hub device 202, the VA device 208, or the backend server 224.

In some embodiments, the device application 726 may include instructions that, when executed by the processor(s) 702, cause the processor(s) to configure one or more settings of the A/V device 210 using the settings data 426. For example, the device application 726 could be an application used by a user to configure settings of or associated with and/or install the A/V device 210. As an example, the device application 726 may include the GUI 142 of FIGS. 1A and 1B. The device application 726 may be associated with a company that manufactures, sells, and/or distributes the A/V device 210. For example, the company may provide the device application 726 for download (e.g., via upload to an app store) and/or operate a backend server (e.g., the backend server 224 or another server) used to facilitate the configuration of the settings and/or installation and configuration of the A/V device 210.

Additionally, or alternatively, the device application 726 may include instructions that, when executed by the processor(s) 702, cause the processor(s) to place an order for one or more items, such as the first A/V device 110A, and/or view delivery information associated with the first A/V device 110A. For example, the device application 726 could be an application used by a user to generate an order for the first A/V device 110A in the package 122 of FIGS. 1A and 1B (e.g., using interface element 152). As an example, the device application 726 may be associated with a package provider company that manufactures, sells, and/or distributes one or more of the items, and/or manages any combination of the forgoing on behalf of other parties (e.g., third-parties). The company may be the same company that is associated with the A/V device 210 or a different company, entity, or party. For example, the entity may provide the device application 726 for download (e.g., via upload to an app store) and/or operate a backend server (e.g., the backend server 224 or another server) used to facilitate the ordering of one or more items, the generation of at least some of the user account data, payment processing for the order, and the like. In some cases, the device application 726 provides an online marketplace a user can use to search for and purchase the items.

Additionally, or alternatively, the device application 726 may include instructions that, when executed by the processor(s) 702, cause the processor(s) to display delivery information for a package containing one or more items, such as the items associated with the message 416. For example, the device application 726 could be an application used by a user to view delivery tracking information of the package 122 of FIGS. 1A and 1B (e.g., using a tracking number). As an example, the device application 726 may be associated with a delivery provider company that transports, tracks, and/or ships packages on behalf of other parties (e.g., third-parties). The company may be the same company that is associated with the A/V device 210 and/or the package provider company, or may be a different company (e.g., a third party company). For example, the company may provide the device application 726 for download (e.g., via upload to an app store) and/or operate a backend server (e.g., the backend server 224 or another server) used to facilitate viewing of tracking information for one or more packages, the generation of at least some of the order information, and the like. This functionality may be implemented in a different device application 726 than the application that is used to provide the user-defined settings and/or install the A/V device 210.

With further reference to FIG. 7, the input interface 704 may include a display 728 (e.g., the display 129 of FIG. 1B). The display 728 may include a touchscreen, such that a user of the client device 214, 216 may provide inputs directly to the display 728. In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc. Additionally, or alternatively, the microphone 706 and/or the camera 714 of the client device 214, 216 may be used to provide user input to the input interface 704.

In some of the present embodiments, in response to receiving the message 416 (e.g., a user alert or notification), the device application 726 may configure the processor(s) 702 to cause the display 728 to display the message 416. The message 416 may correspond to the prompt 162 of FIGS. 1A and 1B, and/or the image data 406. In some cases, while displaying the prompt 162, the input interface 704 may receive input from the user to answer the prompt 162. In response, the device application 726 may configure the processor(s) 702 to transmit the settings data 426 and/or verify the settings data 426 corresponds to the A/V device 210 (e.g., to facilitate the installation procedure). Where the message 416 is received as a push notification, an operating system of the client device 214, 216 may cause display of one or more of the messages 416. Further, interaction with the message 416 may cause the device application 726 to launch and display the message 416 and/or one or more additional ones of the messages 416.

The client device 214, 216 may further include one or more graphical user interfaces (GUIs) 730. The GUIs 730 may be used to access, control, and/or make updates to one or more components of the system 200 (e.g., the A/V device 210, the hub device 202, the VA device 208, the automation devices 206, the sensors 204, etc.). The GUIs may be included within the device application 726 and may correspond to the GUI 142 of FIGS. 1A and 1B. For example, different components of the system 200 may have different device applications 726 for allowing access to, control of, and updates to the components. In some cases, this includes defining, updating, and/or providing any combination of the data stored in the user/household profile 422 and/or the settings data 426. In some examples, the device application 726 may include a single application that is capable of access to, control of, and/or updates to some or all of the components of the system 200.

Although various operations are discussed as being performed by the backend server 224, the hub device 202, the A/V device 210, and the client device 214, 216 any of these operations may be performed by any combination of those devices. Further, the A/V device 210 may correspond to any suitable electronic device, such as a smart home device. In such cases, the A/V device 210 may include more or fewer components than what is shown. Examples include the automation devices 206. Other examples include televisions, speakers, appliances, and the like.

Figure 8:
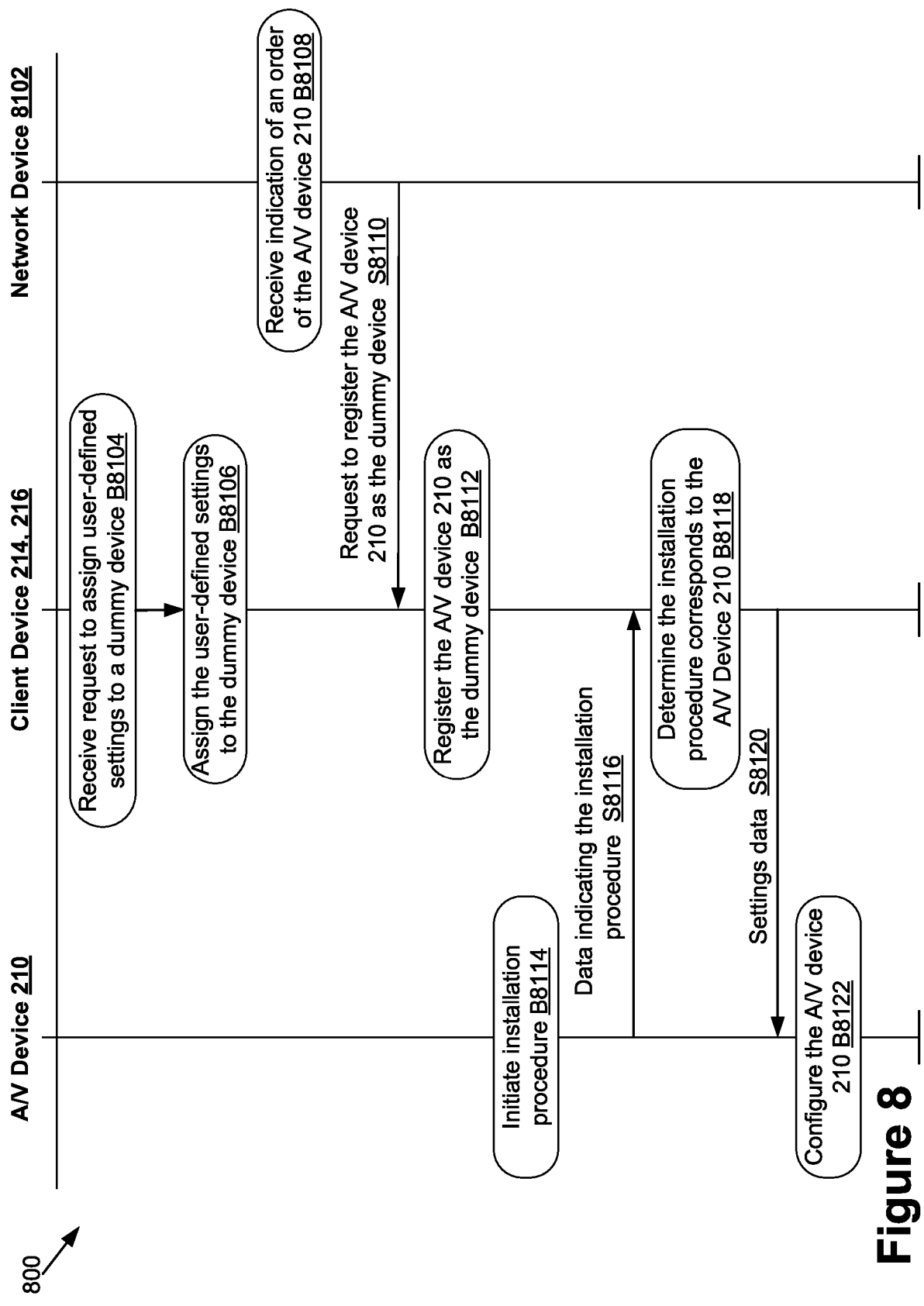
FIG. 8 is a signal diagram of a process for configuring an electronic device using a dummy device according to various aspects of the present disclosure.

FIG. 8 is a signal diagram of a process 800 for configuring an electronic device using a dummy device according to various aspects of the present disclosure. The network device 8102 may include one or more of the hub device 202, the VA device 208, and/or any of the components of the network(s) of servers/backend devices 220 (e.g., the backend server 224, the backend API 226, the storage devices 222, etc.).

The process 800, at block B8104, receives a request to assign user-defined settings to a dummy device. For example, the device application 726 may configure the processor(s) 702 of the client device(s) 214, 216 to receive, using the input interface 704, user input from the user 112 of FIGS. 1A and 1B that corresponds to a request to assign at least some of the settings 130 to the dummy device 140. The user input may be received using the GUI 142 of FIG. 1A.

The process 800, at block B8106, assigns the user-defined settings to the dummy device. For example, the device application 726 may configure the processor(s) 702 of the client device(s) 214, 216 to assign the settings 130 to the dummy device 140 based on the request. This process may include associating at least some of the settings data 426 with the dummy device 430 of the user/household profile 422 associated with the user 112.

The process 800, at block B8108, receives an indication of an order of the A/V device 210. For example, the network device 8102 may receive an indication that the user 112 or another user ordered and/or purchased the A/V device 210 (e.g., in association with the dummy device 140). This process may cause the network device 8102 to register the A/V device 210 as the dummy device 140 or otherwise associate the A/V device 210 with a user account of the user 112. For example, the network device 8102 may record a device identifier of the A/V device 210 to register the A/V device 210 with the user account (e.g., in the user/household profile 422).

The process 800, at signal S8110, transmits a request to register the A/V device 210 as the dummy device. For example, the network device 8102 may transmit the request to register the A/V device 210 as the dummy device 140 to the client device 214, 216. The request may include the device identifier of the A/V device 210.

The process 800, at block B8112, registers the A/V device 210 as the dummy device. For example, based on the receiving of the request, the device application 726 may configure the processor(s) 702 of the client device(s) 214, 216 to register the A/V device 210 as the dummy device 140. This process may include updating the user/household profile 422 associated with the user 112.

The process 800, at block B8114, initiates an installation procedure of the A/V device 210. For example, the device application 404 may configure the processor(s) 310 of the A/V device 210 to initiate an installation procedure of the A/V device 210.

The process 800, at signal S8116, includes data indicating the installation procedure. For example, the device application 404 may configure the processor(s) 310 of the A/V device 210 to transmit the data using the network interface 312. The data may include data representative of the device identifier of the A/V device 210. As shown in FIG. 8, the client device 214, 216 receives the data. Additionally or alternatively, at least some of the data may be received by the client device 214, 216 from the input interface 704. For example, at least some of the data of the signal S8116 could be from the camera 714, such as image data representative of the code 160 in FIG. 1B and/or user input data corresponding to a selection of an installation option in the GUI 142. The data may be received by one or more other devices, such as another A/V device 210, the network device 8102, and/or another network device in addition to or instead of the client device 214, 216. Further, any combination of those devices may send the signal S8120 (described further below) to the A/V device 210. In some cases, this process may further include the other device(s) performing at least some of the functionality of block B8118 (described further below).

The process 800, at block B8118, determines the installation procedure corresponds to the A/V device 210. For example, the device application 404 may configure the processor(s) 310 of the A/V device 210 to determine, based at least in part on receiving the data indicating the installation procedure, the installation procedure corresponds to the A/V device 210. This process may include comparing data received from the signal S8110 (e.g., data representative of the device identifier) to data received from the signal S8116. This process may further involve analyzing the user account data and/or other information to infer the installation procedure corresponds to the A/V device 210 and/or to otherwise validate the installation procedure (e.g., ensure an authorized user is installing the A/V device 210).

The process 800, at signal S8120, transmits settings data corresponding to at least some of the user-defined settings to the A/V device 210. For example, based on determining the installation procedure corresponds to the A/V device 210 at the block B8118, the device application 726 may configure the processor(s) 702 of the client device(s) 214, 216 to transmit at least some of the settings data 426 to the A/V device 210.

The process 800, at block B8122, configures the A/V device 210 using the received settings data. For example, the device application 404 may configure the processor(s) 310 of the A/V device 210 to configure the A/V device 210 using the settings data 426. In some embodiments, the installation procedure may terminate upon completion of the block B8122. In other embodiments, the installation procedure may continue. In some embodiments, the configuration at the block B8122 applies network information, such as network credentials to the device configuration data 440. The A/V device 210 may use the network information to join a network (e.g., automatically), such as a Wi-Fi network, and/or to communicate over a network to receive additional portions of the settings data 426, such as to receive and apply one or more additional settings which may include or be similar to any of the settings 130 or other settings. For example, the A/V device 210 may use the network information to communicate with the network device 8102 (or another network device or A/V device 210) and receive further information (e.g., settings) as part of the installation procedure over the network.

Figure 9:
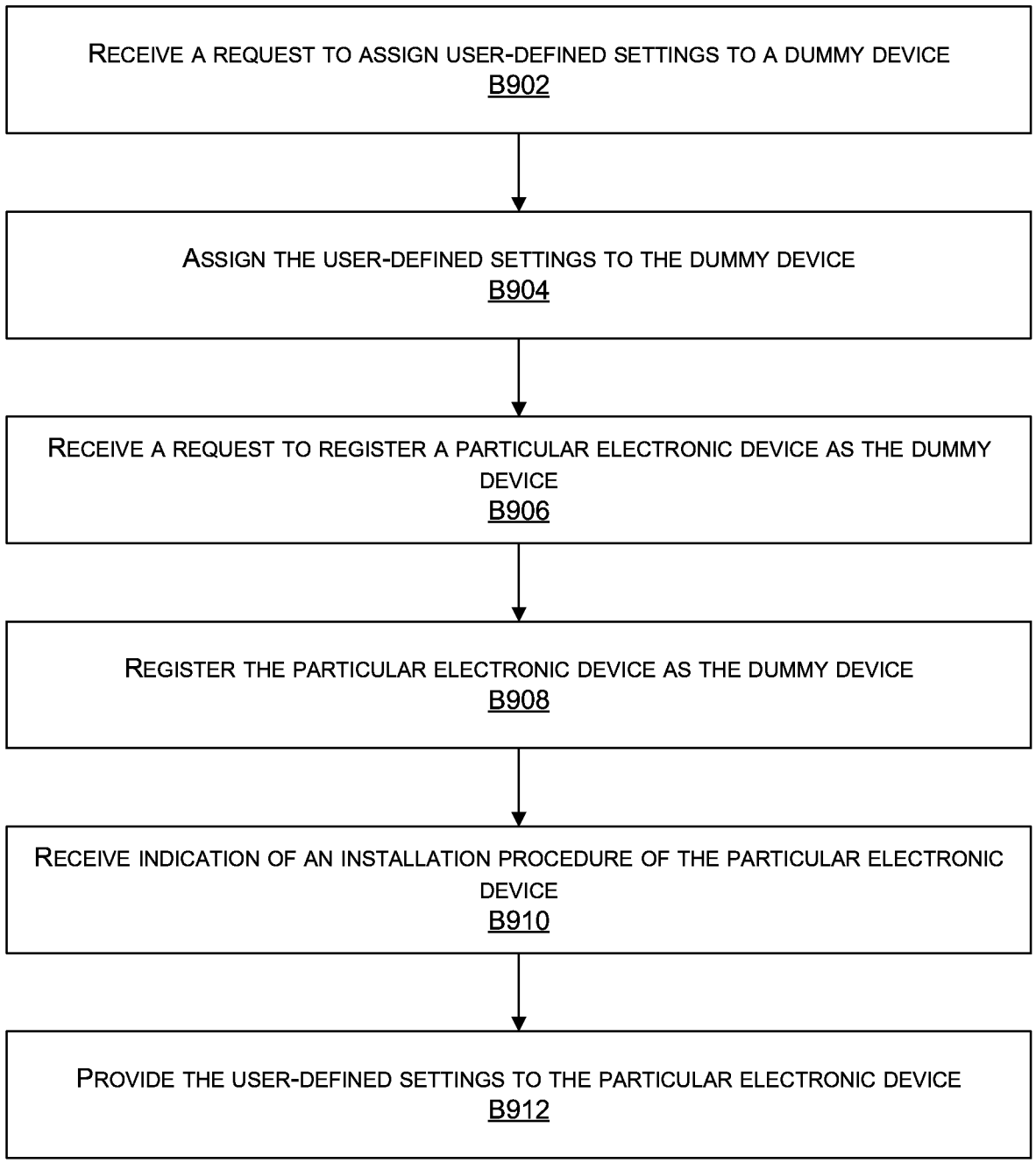
FIGS. 9 and 10 are flowcharts illustrating example processes for configuring electronic devices using dummy devices according to various aspects of the present disclosure.

Now referring to FIG. 9, FIG. 9 is a flowchart illustrating a process 900 for configuring electronic devices using dummy devices according to aspects of the present disclosure. For ease of discussion, the process 900 is discussed with respect to the backend server 224. However, the process 900 may be performed additionally, or alternatively, by other devices (e.g., the hub device 202, the VA device 208, the client devices 214, 216, the application programming interface 226, an A/V device 210, etc.) and/or other devices.

The process 900, at block B902, receives a request to assign user-defined settings to a dummy device. For example, the device application 608 may configure the processor(s) 602 of the backend server 224 to receive, using the network interface 604, in association with a user account of the user 112 (e.g., corresponding to the user/household profile 422 of the user 112), data representative of a request to assign at least some of the settings 130 to the dummy device 140 associated with the user account. For example, the request may correspond to user input to the interface element 148 of FIG. 1A.

The process 900, at block B904, includes assigning the user-defined settings to the dummy device. For example, the device application 608 may configure the processor(s) 602 of the backend server 224 to, based at least in part on the receiving of the data, assign the user-defined settings to the dummy device 140. This process may include storing at least some of the settings 130 in association with the dummy device 140 in the user/household profile 422.

The process 900, at block B906, includes receiving a request to register a particular electronic device as the dummy device. For example, the device application 608 may configure the processor(s) 602 of the backend server 224 to receive, using the network interface 604, data representative of a request to register, using a device identifier of the A/V device 210, the A/V device 210 as the dummy device 140. As an example, the receiving may indicate a purchase of a class of electronic device that correspond to the dummy device. For example, the data may be received from the network device 138A and/or the first client device 114A (e.g., based on user input to the interface element 152 of FIG. 1A).

The process 900, at block B908, includes registering the particular electronic device as the dummy device. For example, the device application 608 may configure the processor(s) 602 of the backend server 224 to, based at least in part on the receiving of the data, record data that registers the device identifier with the dummy device 140. For example, the data may be recorded in the user/household profile 422 associate with the user 112.

The process 900, at block B910, includes receiving an indication of an installation procedure of the particular electronic device. For example, the device application 608 may configure the processor(s) 602 of the backend server 224 to receive, using the network interface 604, data indicating an installation procedure of the A/V device 210. As an example, the data may include the device identifier and/or an API call corresponding to an installation procedure. In some cases, the data may be received from the A/V device 210. For example, the client device 214, 216 may have been used to configure network credentials for a network on the A/V device 210 (e.g., using the process 800 of FIG. 8), and the data may be from the A/V device 210 over the network. As another example, the data may be from the client device 214, 216 (e.g., the first client device 114A and/or the second client device 114B) and/or another A/V device 210 (e.g., the second A/V device 110B of FIGS. 1A and 1B). This aspect may be part of the process 800 of FIG. 8.

The process 900, at block B912, includes providing the user-defined settings to the particular electronic device. For example, the device application 608 may configure the processor(s) 602 of the backend server 224 to transmit at least some of the settings data 426 to the A/V device 210, the client device 214, 216, and/or another A/V device 210, causing configuration of at least some of the user-defined settings on the A/V device 210. The transmitting may be based, at least in part, on the receiving of the data indicating the installation procedure of the A/V device 210 and the data that registers the device identifier with the dummy device 140 (e.g., based on determining the same device identifier is represented by the data).

Figure 10:
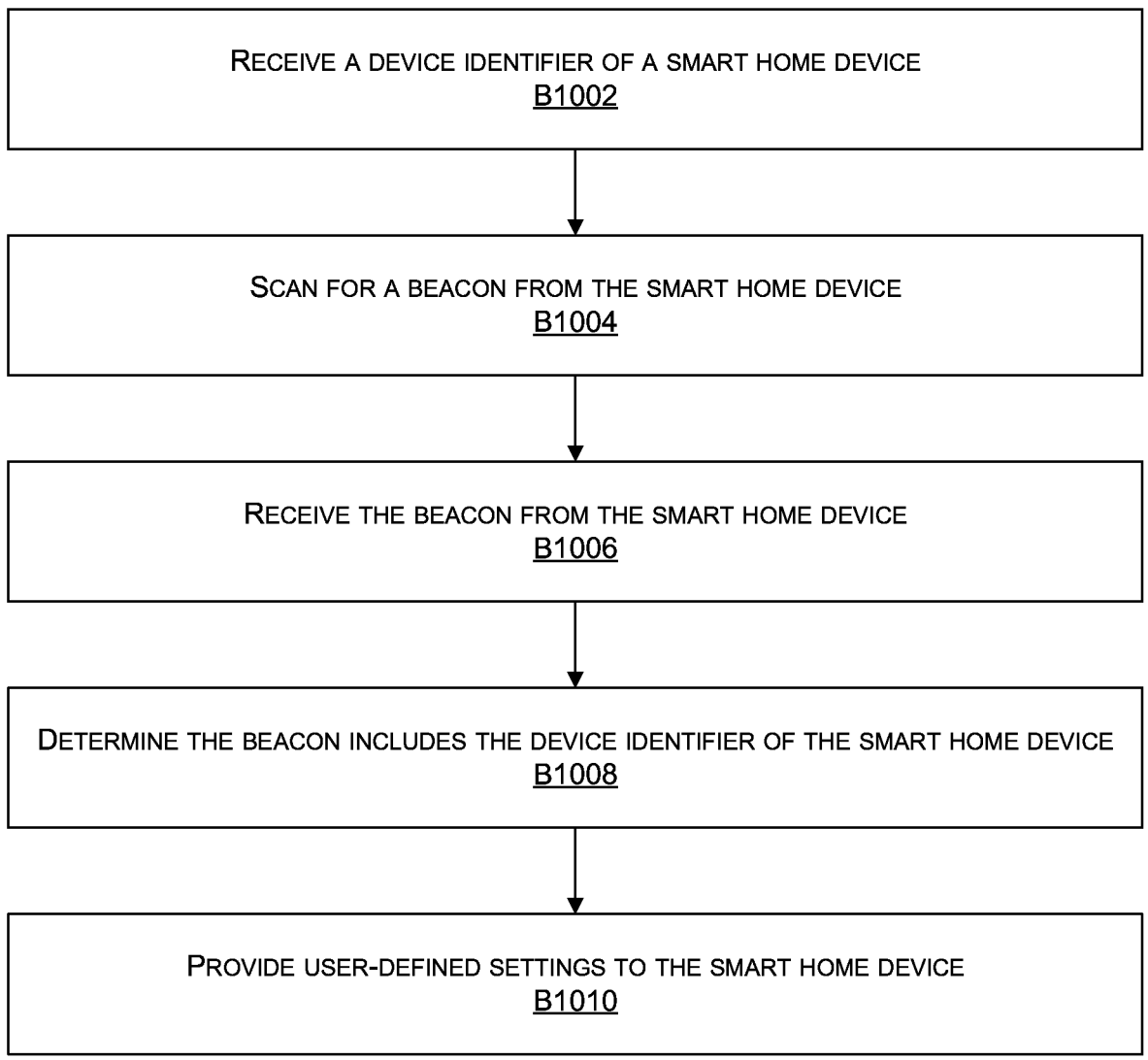

Now referring to FIG. 10, FIG. 10 is a flowchart illustrating a process 1000 for configuring electronic devices using dummy devices according to aspects of the present disclosure. For ease of discussion, the process 1000 is discussed with respect to the A/V device 210 and the A/B device 110B. However, the process 1000 may be performed additionally, or alternatively, by other devices (e.g., the hub device 202, the VA device 208, the application programming interface 226, the backend server 224, etc.) and/or other devices.

The process 1000, at block B1002, includes receiving a device identifier of a smart home device. For example, the device application 404 may configure the processor(s) 310 of the A/V device 210 to receive, using the network interface 312, from the backend server 224, the hub device 202, and/or the client device 214, 216, data representative of a device identifier of the first A/V device 110A. The receiving may indicate a purchase and/or order of the first A/V device 110A. For example, the receiving may be based at least in part on the user 112 purchasing the first A/V device 110A using the interface element 152 of FIG. 1A.

The process 1000, at block B1004, includes scanning for a beacon from the smart home device. For example, the device application 404 may configure the processor(s) 310 of the A/V device 210 (and/or any other device connected to a network) to scan, using the network interface 312, for a beacon from the first A/V device 110A. The beacon may make the first A/V device 110A discoverable via Bluetooth or another wireless technology described herein, such as an LPWAN and/or an Ultra Narrow Band modulation technology network such as RingNet. The beacon may indicate an installation procedure of the first A/V device 110A as described above. Further the scanning may be based at least in part on the receiving of the data representative of the device identifier. Additionally, or alternatively, the scanning may be based on the user account data, such as a delivery notification for the package 122, an expected delivery time for the package 122, etc.

The process 1000, at block B1006, includes receiving the beacon from the smart home device. For example, based at least in part on the scanning, the device application 404 may configure the processor(s) 310 of the A/V device 210 to receiving, using the network interface 312, the beacon from the first A/V device 110A.

The process 1000, at block B1008, includes determining the beacon includes the device identifier of the smart home device. For example, the device application 404 may configure the processor(s) 310 of the A/V device 210 to determine data from the beacon that is representative of the device identifier matches the data received at the block B1002.

The process 1000, at block B1010, includes providing user-defined settings to the smart home device. For example, the device application 404 may configure the processor(s) 310 of the A/V device 210 to provide, using the network interface 312, at least some of the settings data 426 to the first A/V device 110A. This process may include transmitting data causing configuration of at least one of the settings 130 on the first A/V device 110A. As an example, the settings may include network credentials. For example, the network credentials may comprise credentials of a network to which the A/V device 210 is connected (e.g., Wi-Fi credentials of a local network of the user 112). The first A/V device 110A may use the network credentials to receive additional settings and configuration data, as described above. Additionally or alternatively, the user 112 may receive a notification, such as a prompt, on the client device 114A based at least in part on the providing of the user-defined settings to the smart home device. The prompt could correspond to the prompt 162 and/or a prompt that the user 112 may use to specify the device name 130A and/or change the device name 130A.

Figure 11:
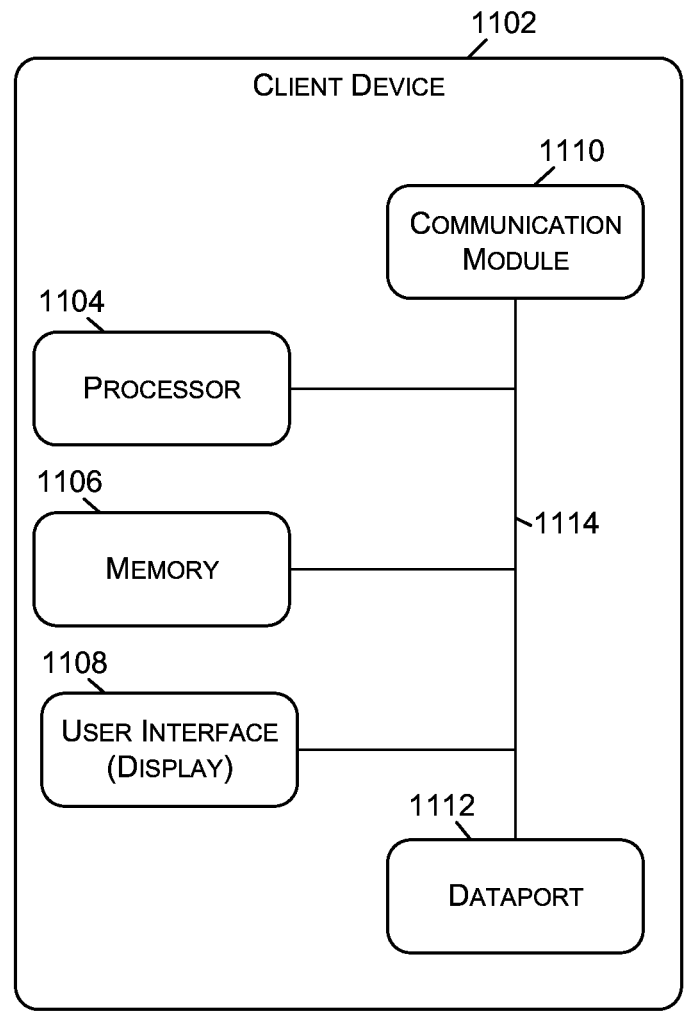
FIG. 11 is a functional block diagram of a client device on which the present embodiments may be implemented according to various aspects of the present disclosure.

FIG. 11 is a functional block diagram of a client device 1102 on which the present embodiments may be implemented according to various aspects of the present disclosure. The client device(s) 214, 216 described with reference to FIG. 2 may include some or all of the components and/or functionality of the client device 1102. The client device 1102 may comprise, for example, a smartphone.

With reference to FIG. 11, the client device 1102 includes a processor 1104, a memory 1106, a user interface 1108, a network interface 1110, and a dataport 1112. These components are communicatively coupled together by an interconnect bus 1114. The processor 1104 may include any processor used in smartphones and/or portable computing devices, such as an ARM processor (a processor based at least in part on the RISC (reduced instruction set computer) architecture developed by Advanced RISC Machines (ARM).). In some embodiments, the processor 1104 may include one or more other processors, such as one or more conventional microprocessors, and/or one or more supplementary co-processors, such as math co-processors.

The memory 1106 may include both operating memory, such as random-access memory (RAM), as well as data storage, such as read-only memory (ROM), hard drives, flash memory, or any other suitable memory/storage element. The memory 1106 may include removable memory elements, such as a CompactFlash card, a MultiMediaCard (MMC), and/or a Secure Digital (SD) card. In some embodiments, the memory 1106 may comprise a combination of magnetic, optical, and/or semiconductor memory, and may include, for example, RAM, ROM, flash drive, and/or a hard disk or drive. The processor 1104 and the memory 1106 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1104 may be connected to the memory 1106 via the dataport 1112.

The user interface 1108 may include any user interface or presentation elements suitable for a smartphone and/or a portable computing device, such as a keypad, a display screen, a touchscreen, a microphone, and a speaker. The network interface 1110 is configured to handle communication links between the client device 1102 and other, external devices or receivers, and to route incoming/outgoing data appropriately. For example, inbound data from the dataport 1112 may be routed through the network interface 1110 before being directed to the processor 1104, and outbound data from the processor 1104 may be routed through the network interface 1110 before being directed to the dataport 1112. The network interface 1110 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1112 may be any type of connector used for physically interfacing with a smartphone and/or a portable computing device, such as a mini-USB port or an IPHONE®/IPOD® 30-pin connector or LIGHTNING® connector. In other embodiments, the dataport 1112 may include multiple communication channels for simultaneous communication with, for example, other processors, servers, and/or client terminals.

The memory 1106 may store instructions for communicating with other systems, such as a computer. The memory 1106 may store, for example, a program (e.g., computer program code) adapted to direct the processor 1104 in accordance with the present embodiments. The instructions also may include program elements, such as an operating system. While execution of sequences of instructions in the program causes the processor 1104 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 12:
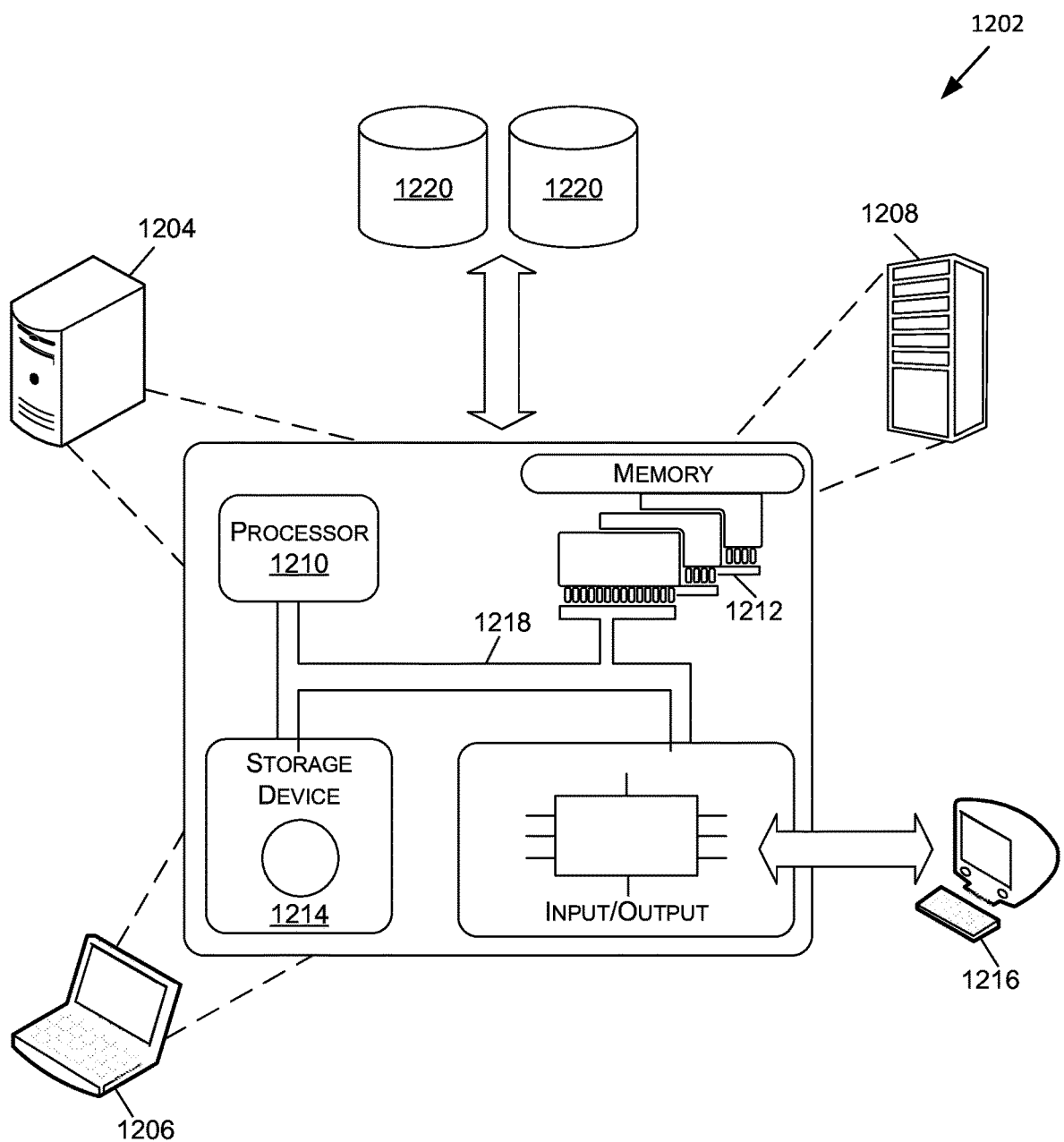
FIG. 12 is a functional block diagram of a general-purpose computing system on which the present embodiments may be implemented according to various aspects of present disclosure.

FIG. 12 is a functional block diagram of a general-purpose computing system on which the present embodiments may be implemented according to various aspects of the present disclosure. The computer system 1202 may be embodied in at least one of a personal computer (also referred to as a desktop computer) 1204, a portable computer (also referred to as a laptop or notebook computer) 1206, and/or a server 1208 is a computer program and/or a machine that waits for requests from other machines or software (clients) and responds to them. A server typically processes data. The purpose of a server is to share data and/or hardware and/or software resources among clients. This architecture is called the client—server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1202 may execute at least some of the operations described above. The computer system 1202 may include at least one processor 1210, memory 1212, at least one storage device 1214, and input/output (I/O) devices 1216. Some or all of the components 1210, 1212, 1214, 1216 may be interconnected via a system bus 1218. The processor 1210 may be single- or multi-threaded and may have one or more cores. The processor 1210 execute instructions, such as those stored in the memory 1212 and/or in the storage device 1214. Information may be received and output using one or more I/O devices 1216.

The memory 1212 may store information, and may be a computer-readable medium, such as volatile or non-volatile memory. The storage device(s) 1214 may provide storage for the system 2102 and, in some embodiments, may be a computer-readable medium. In various aspects, the storage device(s) 1214 may be a flash memory device, a hard disk device, an optical disk device, a tape device, or any other type of storage device.

The I/O devices 1216 may provide input/output operations for the system 1202. The I/O devices 1216 may include a keyboard, a pointing device, and/or a microphone. The I/O devices 1216 may further include a display unit for displaying graphical user interfaces, a speaker, and/or a printer. External data may be stored in one or more accessible external databases 1220.

In a first aspect, a method for a network device, the network device including a processor and a network interface, comprises: receiving, using the network interface, first data representative of a first request to associate a dummy device with a user account; based at least in part on the receiving of the first data, associating the dummy device with the user account, the dummy device representative of a class of audio/video (A/V) recording and communication devices; receiving, using the network interface and in association with the user account, second data representative of a second request to assign user-defined settings to the dummy device associated with the user account; based at least in part on the receiving of the second data, assigning the user-defined settings to the dummy device; receiving, using the network interface, third data representative of a third request to register, using a device identifier of a particular A/V recording and communication device that corresponds to the class of A/V recording and communication devices, the particular A/V recording and communication device as the dummy device, the receiving of the third data indicating a purchase of the class of A/V recording and communication devices; based at least in part on the receiving of the third data, recording, using the processor, fourth data that registers the device identifier with the dummy device; receiving, using the network interface, fifth data indicating an installation procedure of the particular A/V recording and communication device; and based at least in part on the receiving of the fifth data indicating the installation procedure of the particular A/V recording and communication device and the fourth data that registers the device identifier with the dummy device, transmitting sixth data representative of the user-defined settings, the transmitting of the sixth data causing configuration of at least some of the user-defined settings on the particular A/V recording and communication device.

In an embodiment of the first aspect, the fifth data is representative of the device identifier, and the method further includes determining, using the processor, the fifth data matches the fourth data, wherein the transmitting of the sixth data is based at least in part on the determining the fifth data matches the fourth data.

In another embodiment of the first aspect, wherein the transmitting of the sixth data representative of the user-defined settings is based at least in part on determining the installation procedure corresponds to the particular A/V recording and communication device based at least in part on purchase data representative of the purchase of the class of A/V recording and communication devices.

In another embodiment of the first aspect, the receiving of the first data is from a client device based on user input to a graphical user interface on the client device.

In another embodiment of the first aspect, the receiving of the first data is based on the purchase of the class of A/V recording and communication devices.

In another embodiment of the first aspect, the receiving of the first data is based on user input selectively adding the dummy device of the class to a set of AV recording and communication devices associated with the user account.

In another embodiment of the first aspect, the receiving of the second data is based on user input specifying at least some of the user-defined settings.

In another embodiment of the first aspect, the receiving of the second data is from a client device based on user input to a graphical user interface on the client device.

In another embodiment of the first aspect, the receiving of the third data indicates a scan of the particular A/V recording and communication device at a shipping facility.

In another embodiment of the first aspect, the receiving of the third data is from a shipping facility associated with the particular A/V recording and communication device.

In another embodiment of the first aspect, the receiving of the third data is in response to the purchase of the class of A/V recording and communication devices.

In another embodiment of the first aspect, the receiving of the third data indicates a client device scanning a package that contains the particular A/V recording and communication device to determine the device identifier.

In another embodiment of the first aspect, the receiving of the third data indicates a client device scanning a code to determine the device identifier.

In another embodiment of the first aspect, the receiving of the fifth data is from the particular A/V recording and communication device.

In another embodiment of the first aspect, the receiving of the fifth data is from a client device associated with the user account.

In another embodiment of the first aspect, the receiving of the fifth data is from a configured A/V recording and communication device associated with the user account.

In another embodiment of the first aspect, the user-defined settings comprise network credentials.

In another embodiment of the first aspect, the user-defined settings include one or more of a device label and motion alert settings for the particular A/V recording and communication device.

In another embodiment of the first aspect, the particular A/V recording and communication device is at least one of a doorbell, a floodlight camera, and a security camera.

In a second aspect, a method for a network device, the network device including a processor and a network interface, comprises: receiving, using the network interface in association with a user account, first data representative of a first request to assign user-defined settings to a dummy device associated with the user account; based at least in part on the receiving of the first data, assigning the user-defined settings to the dummy device; receiving, using the network interface, second data representative of a second request to register, using a device identifier of a particular electronic device, the particular electronic device as the dummy device; based at least in part on the receiving of the second data, recording, using the processor, third data that registers the device identifier with the dummy device; receiving, using the network interface, fourth data indicating an installation procedure of the particular electronic device; and based at least in part on the receiving of the fourth data indicating the installation procedure of the particular electronic device and the third data that registers the device identifier with the dummy device, transmitting fifth data representative of the user-defined settings, the transmitting of the fifth data causing configuration of at least some of the user-defined settings on the particular electronic device.

In an embodiment of the second aspect, the fourth data is representative of the device identifier, and the method further includes determining, using the processor, the fourth data matches the third data, wherein the transmitting of the fifth data is based at least in part on the determining the fourth data matches the third data.

In another embodiment of the second aspect, the transmitting of the fifth data representative of the user-defined settings is based at least in part on determining the installation procedure corresponds to the particular electronic device based at least in part on purchase data representative of a purchase of the particular electronic device.

In another embodiment of the second aspect, the method further comprises, receiving, using the network interface, sixth data representative of a third request to associate the dummy device with the user account.

In another embodiment of the second aspect, the method further comprises, receiving, using the network interface, sixth data representative of a third request to associate the dummy device with the user account based on user input selectively adding the dummy device to a set of electronic devices associated with the user account.

In another embodiment of the second aspect, the receiving of the first data is based on a purchase of a class of electronic devices that includes the particular electronic device.

In another embodiment of the second aspect, the receiving of the first data is based on user input specifying at least some of the user-defined settings.

In another embodiment of the second aspect, the receiving of the first data is from a client device based on user input to a graphical user interface on the client device.

In another embodiment of the second aspect, the receiving of the second data indicates a scan of the particular electronic device at a shipping facility.

In another embodiment of the second aspect, the receiving of the second data is from a shipping facility associated with the particular electronic device.

In another embodiment of the second aspect, the receiving of the second data is in response to a purchase of a class of electronic devices that includes the particular electronic device.

In another embodiment of the second aspect, the receiving of the second data indicates a client device scanning a package that contains the particular electronic device to determine the device identifier.

In another embodiment of the second aspect, the receiving of the second data indicates a client device scanning a code to determine the device identifier.

In another embodiment of the second aspect, the receiving of the fourth data is from the particular electronic device.

In another embodiment of the second aspect, the receiving of the fourth data is from a client device associated with the user account.

In another embodiment of the second aspect, the receiving of the fourth data is from a configured electronic device associated with the user account.

In another embodiment of the second aspect, the user-defined settings include network credentials.

In another embodiment of the second aspect, the user-defined settings include one or more of a device label and motion alert settings for the particular electronic device.

In another embodiment of the second aspect, the particular electronic device is at least one of a doorbell, a floodlight camera, and a security camera.

In a third aspect, a network device, comprises: a network interface; one or more processors; and a non-transitory machine-readable memory storing a program, the program executable by at least one of the one or more processors, the program comprising instructions for: receiving, using the network interface, first data representative of a first request to assign user-defined settings to a dummy device; based at least in part on the receiving of the first data, assigning the user-defined settings to the dummy device; receiving, using the network interface, second data representative of a device identifier of a particular electronic device; based at least in part on the receiving of the second data, recording third data that registers the particular electronic device as the dummy device using the device identifier; receiving, using the network interface, fourth data indicating an installation procedure of the particular electronic device; and based at least in part on the receiving of the fourth data indicating the installation procedure of the particular electronic device and the third data that registers the device identifier with the dummy device, providing fifth data representative of the user-defined settings to the particular electronic device causing configuration of at least some of the user-defined settings on the particular electronic device.

In an embodiment of the third aspect, the fourth data is representative of the device identifier, and further comprising instructions for determining the fourth data matches the third data, wherein the providing of the fifth data is based at least in part on the determining the fourth data matches the third data.

In another embodiment of the third aspect, the providing of the fifth data representative of the user-defined settings is based at least in part on determining the installation procedure corresponds to the particular electronic device based at least in part on purchase data representative of a purchase of the particular electronic device.

In another embodiment of the third aspect, the network device further comprises instructions for receiving, using the network interface, sixth data representative of a third request to associate the dummy device with a user account.

In another embodiment of the third aspect, the receiving of the first data is based on a purchase of a class of electronic devices that includes the particular electronic device.

In another embodiment of the third aspect, the receiving of the first data is based on user input specifying at least some of the user-defined settings.

In another embodiment of the third aspect, the receiving of the first data is from a client device based on user input to a graphical user interface on the client device.

In another embodiment of the third aspect, the receiving of the second data indicates a scan of the particular electronic device at a shipping facility.

In another embodiment of the third aspect, the receiving of the second data indicates a client device scanning a package that contains the particular electronic device to determine the device identifier.

In another embodiment of the third aspect, the receiving of the fourth data is from the particular electronic device.

In another embodiment of the third aspect, the receiving of the fourth data is from a configured electronic device associated with the particular electronic device.

In another embodiment of the third aspect, the user-defined settings include network credentials.

In another embodiment of the third aspect, the user-defined settings include one or more of a device label and motion alert settings for the particular electronic device.

In another embodiment of the third aspect, the particular electronic device is at least one of a doorbell, a floodlight camera, and a security camera.

In a fourth aspect, a method for a client device, the client device including a processor, a network interface, and an input interface, comprises: receiving, using the input interface, first data representative of a first request to assign user-defined settings to a dummy device, the dummy device representative of a class of audio/video (A/V) recording and communication devices; based at least in part on the receiving of the first data, assigning the user-defined settings to the dummy device; receiving, using the network interface and from at least one network device, second data representative of a second request to register, using a device identifier of a particular A/V recording and communication device that corresponds to the class of A/V recording and communication devices, the particular A/V recording and communication device as the dummy device, the receiving of the second data indicating a purchase of the particular A/V recording and communication device; based at least in part on the receiving of the second data, recording, using the processor, third data that registers the device identifier with the dummy device; receiving, using the input interface, fourth data representative of the device identifier, the receiving of the fourth data corresponding to an installation procedure of the particular A/V recording and communication device; based at least in part on the receiving of the fourth data and the third data that registers the device identifier with the dummy device, causing presentation of a prompt for a confirmation of one or more of the user-defined settings; receiving, using the input interface, fifth data representative of the confirmation of the one or more of the user-defined settings; and based at least in part on the receiving of the fifth data representative of the confirmation of the one or more of the user-defined settings, transmitting sixth data representative of the user-defined settings, the transmitting of the sixth data causing configuration of at least some of the user-defined settings on the particular A/V recording and communication device.

In an embodiment of the fourth aspect, the prompt indicates an installation location for the particular A/V recording and communication device.

In another embodiment of the fourth aspect, the prompt indicates a device label of the particular A/V recording and communication device.

In another embodiment of the fourth aspect, the third data includes image data representative of the device identifier and the method further comprises: analyzing the image data; and determining the device identifier based at least in part on the analyzing of the image data.

In another embodiment of the fourth aspect, the fourth data is representative of the device identifier, and the method further includes determining, using the processor, the fourth data matches the third data, wherein the transmitting of the sixth data is based at least in part on the determining the fourth data matches the third data.

In another embodiment of the fourth aspect, the causing presentation of the prompt is based at least in part on determining the installation procedure corresponds to the particular A/V recording and communication device based at least in part on purchase data representative of the purchase of the class of A/V recording and communication devices.

In another embodiment of the fourth aspect, the receiving of the first data is from user input to a graphical user interface on the client device.

In another embodiment of the fourth aspect, the receiving of the first data is based on the purchase of the class of A/V recording and communication devices.

In another embodiment of the fourth aspect, the receiving of the first data is based on user input selectively adding the dummy device of the class to a set of AV recording and communication devices associated with a user account.

In another embodiment of the fourth aspect, the receiving of the first data is based on user input specifying at least some of the user-defined settings.

In another embodiment of the fourth aspect, the receiving of the second data indicates a scan of the particular A/V recording and communication device at a shipping facility.

In another embodiment of the fourth aspect, the receiving of the second data is from a shipping facility associated with the particular A/V recording and communication device.

In another embodiment of the fourth aspect, the receiving of the second data is in response to the purchase of the class of A/V recording and communication devices.

In another embodiment of the fourth aspect, the receiving of the second data indicates a client device scanning a package that contains the particular A/V recording and communication device to determine the device identifier.

In another embodiment of the fourth aspect, the receiving of the second data indicates a client device scanning a code to determine the device identifier.

In another embodiment of the fourth aspect, the receiving of the fifth data is from user input to a graphic user interface on the client device.

In another embodiment of the fourth aspect, the user-defined settings include network credentials.

In another embodiment of the fourth aspect, the user-defined settings include one or more of a device label and motion alert settings for the particular A/V recording and communication device.

In another embodiment of the fourth aspect, the particular A/V recording and communication device is at least one of a doorbell, a floodlight camera, and a security camera.

In a fifth aspect, a method for a client device, the client device including a processor, a network interface, and an input interface, the method comprising: receiving, using the input interface, first data representative of a first request to assign user-defined settings to a dummy device; based at least in part on the receiving of the first data, assigning the user-defined settings to the dummy device; receiving, using the network interface and from at least one network device, second data representative of a second request to register, using a device identifier of a particular electronic device, the particular electronic device as the dummy device; based at least in part on the receiving of the second data, recording, using the processor, third data that registers the device identifier with the dummy device; receiving, using one or more of the input interface and the network interface, fourth data indicating an installation procedure of the particular electronic device; and based at least in part on the receiving of the fourth data indicating the installation procedure of the particular electronic device and the third data that registers the device identifier with the dummy device, transmitting fifth data representative of the user-defined settings, the transmitting of the fifth data causing configuration of at least some of the user-defined settings on the particular electronic device.

In an embodiment of the fifth aspect, the transmitting of the fifth data representative of the user-defined settings is further based on a user confirmation of the user-defined settings.

In another embodiment of the fifth aspect, the fourth data includes image data representative of the device identifier and the method further comprises: analyzing the image data; and determining the device identifier based at least in part on the analyzing of the image data.

In another embodiment of the fifth aspect, the fourth data is representative of the device identifier, and the method further includes determining, using the processor, the fourth data matches the third data, wherein the transmitting of the sixth data is based at least in part on the determining the fourth data matches the third data.

In another embodiment of the fifth aspect, the transmitting the fifth data representative of the user-defined settings is based at least in part on determining the installation procedure corresponds to the particular electronic device based at least in part on purchase data representative of a purchase of the electronic device.

In another embodiment of the fifth aspect, the receiving of the first data is from user input to a graphical user interface on the client device.

In another embodiment of the fifth aspect, the receiving of the first data is based on user input selectively adding the dummy device to a set of electronic devices associated with a user account.

In another embodiment of the fifth aspect, the receiving of the first data is based on user input specifying at least some of the user-defined settings.

In another embodiment of the fifth aspect, the receiving of the second data indicates a scan of the particular electronic device at a shipping facility.

In another embodiment of the fifth aspect, the receiving of the second data is from a shipping facility associated with the particular electronic device.

In another embodiment of the fifth aspect, the receiving of the second data is in response to a purchase of a class of electronic devices that matches the dummy device.

In another embodiment of the fifth aspect, the receiving of the second data indicates a client device scanning a package that contains the particular electronic device to determine the device identifier.

In another embodiment of the fifth aspect, the receiving of the second data indicates a client device scanning a code to determine the device identifier.

In another embodiment of the fifth aspect, the receiving of the fourth data indicating the installation procedure is from the particular electronic device.

In another embodiment of the fifth aspect, the receiving of the fourth data indicating the installation procedure is from a configured electronic device.

In another embodiment of the fifth aspect, the user-defined settings comprise network credentials.

In another embodiment of the fifth aspect, the user-defined settings comprise one or more of a device label and motion alert settings for the particular electronic device.

In another embodiment of the fifth aspect, the particular electronic device is at least one of a doorbell, a floodlight camera, and a security camera.

In a sixth aspect, a client device comprises: a network interface; one or more processors; and a non-transitory machine-readable memory storing a program, the program executable by at least one of the one or more processors, the program comprising instructions for: receiving, using at least one of the input interface and the network interface, first data representative of a first request to assign user-defined settings to a dummy device; based at least in part on the receiving of the first data, assigning the user-defined settings to the dummy device; receiving, using the network interface, second data representative of a device identifier of a particular electronic device; based at least in part on the receiving of the second data, recording, using the processor, third data that registers the particular electronic device as the dummy device using the device identifier; receiving, using one or more of the input interface and the network interface, fourth data indicating an installation procedure of the particular electronic device; and based at least in part on the receiving of the fourth data indicating the installation procedure of the particular electronic device and the third data that registers the device identifier with the dummy device, transmitting fifth data representative of the user-defined settings, the transmitting of the fifth data causing configuration of at least some of the user-defined settings on the particular electronic device.

In an embodiment of the sixth aspect, the transmitting of the fifth data representative of the user-defined settings is further based on a user confirmation of the user-defined settings.

In another embodiment of the sixth aspect, the fourth data includes image data representative of the device identifier and the client device further comprises instructions for: analyzing the image data; and determining the device identifier based at least in part on the analyzing of the image data.

In another embodiment of the sixth aspect, the fourth data is representative of the device identifier, and the method further includes determining, using the processor, the fourth data matches the third data, wherein the transmitting of the sixth data is based at least in part on the determining the fourth data matches the third data.

In another embodiment of the sixth aspect, the transmitting the fifth data representative of the user-defined settings is based at least in part on determining the installation procedure corresponds to the particular electronic device based at least in part on purchase data representative of a purchase of the electronic device.

In another embodiment of the sixth aspect, the receiving of the first data is from user input to a graphical user interface on the client device.

In another embodiment of the sixth aspect, the receiving of the first data is based on user input selectively adding the dummy device to a set of electronic devices associated with a user account.

In another embodiment of the sixth aspect, the receiving of the first data is based on user input specifying at least some of the user-defined settings.

In another embodiment of the sixth aspect, the receiving of the second data indicates a scan of the particular electronic device at a shipping facility.

In another embodiment of the sixth aspect, the receiving of the second data is from a shipping facility associated with the particular electronic device.

In another embodiment of the sixth aspect, the receiving of the second data is in response to a purchase of a class of electronic devices that matches the dummy device.

In another embodiment of the sixth aspect, the receiving of the second data indicates a client device scanning a package that contains the particular electronic device to determine the device identifier.

In another embodiment of the sixth aspect, the receiving of the second data indicates a client device scanning a code to determine the device identifier.

In another embodiment of the sixth aspect, the receiving of the fourth data indicating the installation procedure is from the particular electronic device.

In another embodiment of the sixth aspect, the receiving of the fourth data indicating the installation procedure is from a configured electronic device.

In another embodiment of the sixth aspect, the user-defined settings comprise network credentials.

In another embodiment of the sixth aspect, the user-defined settings comprise one or more of a device label and motion alert settings for the particular electronic device.

In another embodiment of the sixth aspect, the particular electronic device is at least one of a doorbell, a floodlight camera, and a security camera.

In a seventh aspect, a method for a smart home device, the smart home device including a processor and a network interface, the method comprising: receiving, using the network interface and from a network device, first data representative of a device identifier of a particular audio/video (A/V) recording and communication device, the receiving of the first data indicating a purchase of the particular A/V recording and communication device; based at least in part on the receiving of the first data, scanning, using the network interface, for a beacon from the particular A/V recording and communication device, the beacon indicating an installation procedure of the particular A/V recording and communication device; based at least in part on the scanning, receiving the beacon from the second smart home device, the beacon including second data representative of the device identifier of the particular A/V recording and communication device; determining, using the processor, the second data representative of the device identifier matches the first data representative of the device identifier; and based at least in part on the determining the second data representative of the device identifier matches the first data representative of the device identifier, transmitting, using the network interface, third data representative of network credentials to the particular A/V recording and communication device, the transmitting of the third data causing configuration of at least some of the network credentials on the particular A/V recording and communication device.

In an embodiment of the seventh aspect, the particular A/V recording and communication device is at least one of a doorbell, a floodlight camera, and a security camera.

In another embodiment of the seventh aspect, the smart home device is at least one of a doorbell, a floodlight camera, and a security camera.

In another embodiment of the seventh aspect, the network device includes one or more of a hub device, a virtual assistant device, and a backend server.

In another embodiment of the seventh aspect, the transmitting of the third data further causes the particular A/V recording and communication device to receive user-defined settings over a network accessed using the network credentials.

In an eighth aspect, a method for a first smart home device, the first smart home device including a processor, a camera, and a network interface, comprises: receiving, using the network interface and from a network device, first data representative of a device identifier of a second smart home device, the receiving of the first data indicating a purchase of the second smart home device; based at least in part on the receiving of the first data, scanning, using the network interface, for a beacon from the second smart home device, the beacon indicating an installation procedure of the second smart home device; based at least in part on the scanning, receiving the beacon from the second smart home device, the beacon including second data representative of the device identifier of the second smart home device; determining, using the processor, the second data representative of the device identifier matches the first data representative of the device identifier; and based at least in part on the determining the second data representative of the device identifier matches the first data representative of the device identifier, transmitting, using the network interface, third data representative of user-defined settings to the second smart home device, the transmitting of the third data causing configuration of at least some of the user-defined settings on the second smart home device.

In an embodiment of the eighth aspect, the first smart home device is at least one of a doorbell, a floodlight camera, and a security camera.

In another embodiment of the eighth aspect, the second smart home device is at least one of a doorbell, a floodlight camera, and a security camera.

In another embodiment of the eighth aspect, the network device includes one or more of a hub device, a virtual assistant device, and a backend server.

In another embodiment of the eighth aspect, the user-defined settings include network credentials.

In another embodiment of the eighth aspect, the user-defined settings include one or more of a device label and motion alert settings for the second smart home device.

In another embodiment of the eighth aspect, the user-defined settings include network credentials and the transmitting of the third data further causes the second smart home device to receive additional user-defined settings over a network accessed using the network credentials.

In a ninth aspect, a first smart home device comprises: a network interface; one or more processors; and a non-transitory machine-readable memory storing a program, the program executable by at least one of the one or more processors, the program comprising instructions for: receiving, using the network interface, first data representative of a device identifier of a second smart home device, the receiving of the first data indicating a purchase of the second smart home device; based at least in part on the receiving of the first data, receiving, using the network interface, a beacon from the second smart home device, the beacon indicating an installation procedure of the second smart home device and including second data representative of the device identifier of the second smart home device; determining, using the processor, the second data representative of the device identifier matches the first data representative of the device identifier; and based at least in part on the determining the second data representative of the device identifier matches the first data representative of the device identifier, providing, using the network interface, third data representative of user-defined settings, the providing of the third data causing configuration of at least some of the user-defined settings on the second smart home device.

In an embodiment of the ninth aspect, the first smart home device is at least one of a doorbell, a floodlight camera, and a security camera.

In another embodiment of the ninth aspect, the second smart home device is at least one of a doorbell, a floodlight camera, and a security camera.

In another embodiment of the ninth aspect, the receiving of the first data is from one or more of a hub device, a virtual assistant device, and a backend server.

In another embodiment of the ninth aspect, the user-defined settings include network credentials.

In another embodiment of the ninth aspect, the user-defined settings include one or more of a device label and motion alert settings for the second smart home device.

In another embodiment of the ninth aspect, the user-defined settings include network credentials and the providing of the third data further causes the second smart home device to receive additional user-defined settings over a network accessed using the network credentials.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for a first smart home device, the first smart home device including a processor and a network interface, the method comprising:
    receiving, at a first time using the network interface and from a remote system, first data representing a first device identifier associated with a second smart home device;
    receiving, by the first smart home device using the network interface and from the remote system, second data representing user-defined settings comprising a device label for the second smart home device;
    receiving, at a second time that is after the first time, a beacon transmitted by the second smart home device, the beacon indicating an installation procedure of the second smart home device and including third data representing a second device identifier associated with the second smart home device;
    determining, by the first electronic device, that the second device identifier represented by the third data corresponds to the first device identifier represented by the first data; and
    based at least in part on the determining that the second device identifier represented by the third data corresponds to the first device identifier represented by the first data, sending, by the first electronic device and to the second electronic device, the second data representing the user-defined settings for the second electronic device.

2. The method of claim 1, wherein the defined settings comprises network credentials.

3. A method comprising:
    receiving, by a remote system and at a first time, first data representing user-defined settings associated with a device type, the user-defined settings including a device label for a first electronic device;
    receiving, by the remote system after the first time:
        second data communicated by a smart home electronic device, the second data representing a device identifier associated with the first electronic device that is the device type, and
        third data indicating an installation procedure of the first electronic device; and
    based at least in part on the receiving of the third data indicating the installation procedure of the first electronic device, sending, by the remote system, fourth data representing the user-defined settings for the first electronic device.

4. The method of claim 3, wherein the method comprises:
    storing, by the remote system, the first data representing user-defined settings in association with user account data; and
    storing, by the remote system, the device identifier in association with the user account data.

5. The method of claim 3, wherein the receiving of the third data indicating the installation procedure of the first electronic device comprises
    receiving, by the remote system, data indicating that the first electronic device is being configured.

6. The method of claim 3, wherein the sending of the fourth data representing the user-defined settings for the first electronic device comprises sending, by the remote system, the fourth data to the first electronic device.

7. The method of claim 3, wherein the user-defined settings comprises a motion alert setting.

8. The method of claim 3, wherein the fourth data is sent to the smart home electronic device.

9. The method of claim 3, wherein the second data comprises purchase data representative of a purchase of the first electronic device.

10. The method of claim 3, wherein the sending of the fourth data representing the user-defined settings for the first electronic device comprises
    sending, by the remote system, the fourth data to a second electronic device that is associated with the first electronic device.

11. The method of claim 3, wherein the receiving of the third data indicating the installation procedure of the first electronic device comprises receiving, by the remote system, data indicating that the first electronic device is being installed.

12. A method comprising:
    receiving, by a remote system and at a first time, first data representing user-defined settings associated with a device type;
    receiving, by the remote system after the first time:
        second data communicated by a smart home electronic device, the second data representing a device identifier associated with a first electronic device that is the device type, and
        third data indicating an installation procedure of the first electronic device;
    determining, based at least in part on the second data, that the first electronic device is the device type; and
    based at least in part on the determining that the first electronic device is the device type and the receiving of the third data indicating the installation procedure of the first electronic device, sending, by the remote system, fourth data representing the user-defined settings for the first electronic device.

13. The method of claim 12, wherein the second data is received by the smart home electronic device upon detecting the first electronic device.

14. The method of claim 12, wherein the fourth data is provided to the smart home electronic device and caused to be installed on the first electronic device.

15. The method of claim 12, wherein the fourth data is sent to the smart home electronic device.

16. The method of claim 12, wherein the sending of the fourth data representing the user-defined settings for the first electronic device comprises sending, by the remote system, the fourth data to the first electronic device.

17. The method of claim 12, wherein the sending of the fourth data representing the user-defined settings for the first electronic device comprises sending, by the remote system, the fourth data to a second electronic device that is associated with the first electronic device.

18. The method of claim 12, wherein the receiving of the third data indicating the installation procedure of the first electronic device comprises receiving, by the remote system, data indicating that the first electronic device is being configured.

19. The method of claim 12, wherein the receiving of the third data indicating the installation procedure of the first electronic device comprises receiving, by the remote system, data indicating that the first electronic device is being installed.

* * * * *

UNITED STATES PATENT AND TRADEMARK OFFICE
CERTIFICATE OF CORRECTION

PATENT NO. : 12,015,498 B1
APPLICATION NO. : 16/186424
DATED : June 18, 2024
INVENTOR(S) : Elliott Lemberger et al.

Page 1 of 1

It is certified that error appears in the above-identified patent and that said Letters Patent is hereby corrected as shown below:

In the Claims

Column 55 Line 38, Claim 1 change "electronic" to -- smart home --;
Column 55 Line 45, Claim 1 change "electronic" to -- smart home --;
Column 55 Line 46, Claim 1 change "electronic" to -- smart home --;
Column 55 Line 47, Claim 1 change "electronic" to -- smart home --.

Signed and Sealed this
Tenth Day of September, 2024

Katherine Kelly Vidal
*Director of the United States Patent and Trademark Office*